US008265890B2

(12) United States Patent
Suzuki

(10) Patent No.: US 8,265,890 B2
(45) Date of Patent: Sep. 11, 2012

(54) MICROCOMPUTER-EQUIPPED SYSTEM AND BATTERY PACK FOR ELECTRIC POWER TOOL

(75) Inventor: Hitoshi Suzuki, Anjo (JP)

(73) Assignee: Makita Corporation, Anjo-Shi (JP)

( * ) Notice: Subject to any disclaimer, the term of this patent is extended or adjusted under 35 U.S.C. 154(b) by 416 days.

(21) Appl. No.: 12/461,914

(22) Filed: Aug. 27, 2009

(65) Prior Publication Data

US 2010/0063757 A1 Mar. 11, 2010

(30) Foreign Application Priority Data

Sep. 5, 2008 (JP) ................. 2008-228314

(51) Int. Cl.
*G06F 19/00* (2006.01)
*H02J 7/00* (2006.01)
(52) U.S. Cl. ........................................................ 702/63
(58) Field of Classification Search .................. 702/63
See application file for complete search history.

(56) References Cited

U.S. PATENT DOCUMENTS

| 2001/0026145 A1 | 10/2001 | Ohya |
| 2005/0160334 A1* | 7/2005 | Kabune ........................ 714/724 |
| 2007/0097566 A1* | 5/2007 | Woods et al. .................. 361/33 |
| 2009/0189572 A1 | 7/2009 | Kamatani |

FOREIGN PATENT DOCUMENTS

| EP | 1 523 082 A1 | 4/2005 |
| JP | A-2007-236066 | 9/2007 |

OTHER PUBLICATIONS

"Protection for Lithium-Ion Batteries (2-serial cells) Monolithic IC MM3112 Series;" *Mitsumi Electric Co., Ltd.*; <http:www.mitsumi.co.jp/Catalog/pdf/battery_mm_3112_e.pdf>, Oct. 27, 2007.
Nov. 22, 2011 Search Report issued in European Patent Application No. 09011214.5.
European Office Action issued on May 30, 2012 for European Patent Application No. 09 011 214.5.

* cited by examiner

*Primary Examiner* — Cindy H Khuu
(74) *Attorney, Agent, or Firm* — Oliff & Berridge, PLC

(57) ABSTRACT

A microcomputer-equipped system for electric power tool includes a microcomputer, a reference voltage generator, a reference data storage unit, and a first determiner. The microcomputer includes an analog-to-digital (AD) converter and at least one AD port. The reference voltage generator generates and inputs to the AD port a reference voltage having a predetermined value. The reference data storage unit prestores reference data corresponding to the reference voltage. The first determiner compares diagnostic data obtained by AD conversion by the AD converter of the reference voltage inputted to the AD port with the reference data to determine, in case that difference between the diagnostic data and the reference data is out of a predefined allowable range, that an AD abnormal state has occurred in which a correct result of the AD conversion is unable to be obtained from the AD converter.

18 Claims, 7 Drawing Sheets

MICROCOMPUTER-EQUIPPED SYSTEM AND BATTERY PACK FOR ELECTRIC POWER TOOL

CROSS-REFERENCE TO RELATED APPLICATIONS

This application claims the benefit of Japanese Patent Application No. 2008-228314 filed Sep. 5, 2008 in the Japan Patent Office, the disclosure of which is incorporated herein by reference.

BACKGROUND

The present invention relates to a system equipped with a microcomputer including an AD (analog-to-digital) converter and mounted on a power tool body, a battery pack for electric power tool or a charger for electric power tool. The present invention also relates to a battery pack for electric power tool equipped with the above system.

In recent years, a battery pack for electric power tool which includes various types of rechargeable batteries, such as a nickel hydride rechargeable battery, a lithium ion rechargeable battery and others, are equipped with a microcomputer to achieve high functionality and high efficiency. The microcomputer is known to control charging/discharging of the rechargeable battery based on various information such as the voltage, temperature and others of the rechargeable battery, and detect overcharging/overdischarging of the rechargeable battery.

Not just a battery pack but a widely used charger for electric power tool which supplies charging power to a battery pack for charging a rechargeable battery, or power tool body which receives power supply from a battery pack to operate, is also equipped with a microcomputer and configured to perform various control by the microcomputer.

The microcomputer installed in a battery pack, a charger for electric power tool and a power tool body generally includes an AD converter. In the battery pack, for example, various information (analog signals) such as the voltage, temperature, and so on of a rechargeable battery inside the battery pack are inputted from an AD port of the microcomputer to the internal AD converter and converted to digital data by the AD converter. The microcomputer determines various conditions inside the battery pack including the rechargeable battery, and based on the conditions, performs various controls such as charging/discharging control and detection of overcharging/overdischarging.

In the battery pack and the charger in which various controls are performed by the microcomputer including the AD converter, if an AD converter inside the microcomputer itself fails or any abnormality occurs to the AD port of the microcomputer due to adhesion of dust, and the inputted analog signal is no longer converted to digital data correctly (hereinafter, collectively referred to as "AD abnormality"), various controls by the microcomputer may not be performed correctly.

For example, it is assumed that the AD abnormality occurs when the microcomputer receives the voltage of the rechargeable battery via the AD converter and controls charging based on the voltage value. Then, the microcomputer becomes unable to correctly recognize the voltage of the rechargeable battery, e.g., the AD converter may incorrectly convert the voltage of the rechargeable battery to 2V although the rechargeable battery is actually charged to 3V. In such case, the microcomputer may continue charging although the rechargeable battery is already fully charged. The rechargeable battery may be overcharged.

In order to protect the rechargeable battery from malfunctioning of the microcomputer deriving from the AD abnormality as such, a protection IC (which is called a second protection IC) is provided separately from the microcomputer, which detects the voltage of the rechargeable battery to detect overcharging/overdischarging in a conventional method (see APPLICATION CIRCUIT diagram in "Protection for Lithium-Ion Batteries (2-serial cells) Monolithic IC MM3112 Series" by MITSUMI ELECTRIC CO., LTD., <http:www.mitsumi.co.jp/Catalog/pdf/battery_mm_3112_e.pdf>)

The protection IC detects the voltage of each battery cells of an assembled battery in which a plurality of battery cells (rechargeable batteries) are connected in series. In case that overcharging or overdischarging is detected in any one of the battery cells, protection operation is performed to forcibly stop charging/discharging. The protection operation is performed by interrupting a current path by turning off a FET connected between a positive terminal of the battery pack and a positive terminal of the rechargeable battery (positive terminal of the battery cell having a highest potential).

Accordingly, even if the voltage of the rechargeable battery is not correctly AD converted due to the AD abnormality in the microcomputer, the rechargeable battery can be protected by such protection IC when the rechargeable battery is brought into an overcharged/overdischarged state.

In the above-described protection method utilizing a protection IC, the AD abnormality cannot be detected unless the rechargeable battery is in (or close to) an overcharged/overdischarged state. Therefore, upon occurrence of the AD abnormality, the rechargeable battery has to be out of the normal voltage range at least temporarily.

Specifically, the protection IC does not detect the AD abnormality in the microcomputer, but checks the actual voltage of the rechargeable battery. If the voltage is higher than normal (i.e., the rechargeable battery is in or close to an overcharged state), the protection IC determines that the rechargeable battery is in an overcharged state and activates the protection operation. Accordingly, even if the AD abnormality occurs to the microcomputer and the voltage of the rechargeable battery is not correctly AD converted, the protection operation is not activated immediately. After the charging voltage of the rechargeable battery is gradually increased to an overcharged state due to the AD abnormality, the protection IC activates the protection operation. Thus, it is inevitable that the voltage of the rechargeable battery at least temporarily goes out of the normal range.

Also, since the protection IC is separately provided from the microcomputer, a space for installing the protection IC becomes necessary. The battery pack becomes large in size. There is an increase in costs as a whole including the cost for the protection IC itself.

Not only in the battery pack but also in the microcomputer mounted on a charger or a power tool body, normal control by the microcomputer may not be performed if the AD abnormality occurs.

SUMMARY

In one aspect of the present invention, it is preferable that the AD abnormality can be detected without providing the protection IC separately from the microcomputer in case that the microcomputer is brought into an AD abnormal state.

A microcomputer-equipped system for electric power tool in a first aspect of the present invention may include a microcomputer, a reference voltage generator, a reference data storage unit, and a first determiner. The microcomputer may include an analog-to-digital (AD) converter and at least one AD port to which an analog signal to be AD converted by the AD converter is inputted. The reference voltage generator may be separately provided from an operation power source of the microcomputer, and generate and input to the AD port a reference voltage having a predetermined value. The reference data storage unit may prestore reference data which is digital data corresponding to the reference voltage. The first determiner may be provided inside the microcomputer and compare diagnostic data obtained by AD conversion by the AD converter of the reference voltage inputted to the AD port with the reference data stored in the reference data storage unit to determine, in case that difference between the diagnostic data and the reference data is out of a predefined allowable range, that an AD abnormal state has occurred in which a correct result of the AD conversion is unable to be obtained from the AD converter.

In the microcomputer-equipped system for electric power tool constituted as such, the digital data corresponding to the reference voltage, that is a value obtained when the AD converter correctly digitalizes the reference voltage is prestored in the reference data storage unit as the reference data, for example, at the factory. Therefore, if the AD converter is a normal state (hereinafter, referred to as an "AD normal state") in which the analog signal inputted to the AD port is correctly converted to the digital data, the result of actual AD conversion of the reference voltage by the AD converter (diagnostic data) should be consistent with the reference data stored in the reference data storage unit, or, even though the diagnostic data is not completely consistent with the reference data, a difference therebetween should be within the allowable range. On the other hand, in the case of the AD abnormal state, the correct result of the AD conversion with respect to the reference voltage is unable to be obtained. Thus, the difference between the diagnostic data and the reference data goes out of the allowable range. The first determiner determines that the AD abnormal state has occurred in case that the difference therebetween is out of the allowable range as such.

According to the microcomputer-equipped system for electric power tool constituted as such, the correct digital data corresponding to the reference voltage (reference data) is prestored and the microcomputer itself (in detail, the first determiner inside the microcomputer) determines whether or not the AD abnormal state has occurred based on the result of comparison between the stored reference data and the result of the actual AD conversion (diagnostic data). Therefore, without providing a protection IC separately from the microcomputer as in the prior art, the microcomputer itself can detect that the AD abnormal state has occurred with precision.

Especially, even if the cause of the AD abnormal state is an abnormality in the AD converter itself, the abnormality can be reliably determined. Specifically, one of the causes that the AD converter itself becomes abnormal is considered, for example, due to a decrease in a voltage of the operation power source supplied to the microcomputer. When the voltage of the operation power source of the microcomputer is decreased, the AD converter included in the microcomputer becomes unable to perform AD conversion correctly. However, the reference voltage generator that generates the reference voltage is provided separately from the operation power source of the microcomputer. Therefore, abnormality in the AD conversion itself can be appropriately determined by using the reference voltage.

The above-described microcomputer-equipped system for electric power tool is preferably mounted on a power tool body, a battery pack for electric power tool or a charger for electric power tool.

The reference voltage generator may be particularly configured in various manners. For example, the reference voltage generator may receive a predefined voltage of the operation power source supplied to the microcomputer, and generate the reference voltage lower than the predefined voltage of the operation power source.

If the reference voltage generator is configured as such, the reference voltage generated by the reference voltage generator is originally set to a lower value than the predetermined value even if the voltage of the operation power source of the microcomputer is decreased from the predetermined voltage. Therefore, the reference voltage can be generated by using the operation power of the microcomputer and without being affected by fluctuation in the voltage of the operation power source.

The microcomputer-equipped system for electric power tool in which the reference voltage generator is constituted as such may be configured as below. The system includes a resetting unit that outputs a reset signal to the microcomputer when the voltage of the operation power source of the microcomputer becomes a predefined lower limit or smaller. The microcomputer is configured such that its operation is initialized when a reset signal is inputted from the reset unit. The reference voltage generator generates as the reference voltage a voltage that is smaller than the lower limit and capable of being AD converted by the AD converter.

According to the microcomputer-equipped system for electric power tool constituted as such, the reference voltage generator generates the reference voltage smaller than the lower limit. Even if the voltage of the operation power source of the microcomputer is decreased (i.e., even if the input power voltage inputted to the reference voltage generator is decreased), the reference voltage generator can normally generate the reference voltage. If the voltage of the operation power source of the microcomputer is decreased to the lower limit or smaller, the reference voltage generator may not be able to correctly generate the reference voltage depending on the value. However, the microcomputer is initialized in the first place when the voltage of the operation power source of the microcomputer is decreased to the lower limit or smaller. Then, the determination by the microcomputer on whether or not the AD abnormal state has occurred is not performed. No substantial effect is produced.

Moreover, the reference voltage generator may particularly include, for example, a diode, and be configured to generate as the reference voltage a forward voltage of the diode generated by applying a forward bias to the diode by a power inputted to the reference voltage generator. Generation of the reference voltage by using the forward voltage of the diode can simplify the configuration of the reference voltage generator, and further simplify the configuration of the microcomputer-equipped system for electric power tool.

The microcomputer-equipped system for electric power tool of the present invention may further include a determination function by a second determiner, in addition to the determination function by the first determiner. Specifically, the microcomputer-equipped system for electric power tool may include a signal voltage divider, and a command output unit. The signal voltage divider is provided on a signal path till where the analog signal to be AD converted is inputted to the AD converter. The signal voltage divider generates a diagnostic analog signal by voltage division of the analog signal at a predefined voltage dividing ratio when an execution command is inputted. The command output unit is provided inside the microcomputer. The command output unit outputs to the signal voltage divider the execution command for directing the signal voltage divider execute the voltage division or a stop command for keeping the signal voltage divider from executing the voltage division. The second determiner that is provided inside the microcomputer, obtains diagnostic data by directing the command output unit output the execution command to execute the voltage division by the signal voltage divider and directing the AD converter AD convert the diagnostic analog signal obtained by the voltage division, obtains comparative data by directing the command output unit output the stop command to stop the voltage division by the signal voltage divider and directing the AD converter AD convert the analog signal. The second determiner then compares the obtained diagnostic data and the comparative data, and determines that the AD abnormal state has occurred when the diagnostic data and the comparative data do not satisfy a relation corresponding to the voltage dividing ratio in the signal voltage divider.

In the microcomputer-equipped system for electric power tool including the second determiner, the comparative data which is a result of the AD conversion when the voltage division is not executed by the signal voltage divider is compared with the diagnostic data which is a result of the AD conversion when the voltage division is executed by the signal voltage divider. In the case of the AD normal state, the relation of both data should correspond to the voltage dividing ratio in the signal voltage divider. On the other hand, in the case of the AD abnormal state, the relation of both data does not correspond to the voltage dividing ratio. In this case, the second determiner determines that the AD abnormal state has occurred.

According to the microcomputer-equipped system for electric power tool constituted as such, whether or not the AD abnormal state has occurred can be determined through the signal voltage divider based on the results of the AD conversion upon execution and non-execution of the voltage division. Therefore, precise determination can be achieved by a simple constitution.

The microcomputer-equipped system for electric power tool including the second determiner may be particularly configured as below. A signal input circuit including at least one resistor connected in series may be provided on the signal path till where the analog signal to be AD converted is inputted to the AD port. The signal voltage divider may be provided on the signal path from the signal input circuit to the AD converter, and generate the diagnostic analog signal by voltage division of the analog signal to be AD converted inputted to the signal input circuit at the voltage dividing ratio when the execution command is inputted.

In the microcomputer-equipped system for electric power tool constituted as such, the signal input circuit is provided ahead of the signal voltage divider. Thus, the voltage dividing ratio in the signal voltage divider is determined by the constitution inside the signal voltage divider (constitution that contributes to the voltage division) and a resistance of the resistor constituting the signal input circuit. In such system including the signal input circuit, a desired voltage dividing ratio can be achieved by using the resistor constituting the signal input circuit.

The signal voltage divider may be particularly constituted to include a voltage dividing resistor and a voltage division controller. One end of the voltage dividing resistor is electrically connected to the AD port. The voltage division controller makes the other end of the voltage dividing resistor electrically open when the stop command is inputted, and electrically connect the other end of the voltage dividing resistor to a region having a lower potential than the one end when the execution command is inputted, so as to pass a current to the voltage dividing resistor for the voltage division. In this manner, the signal voltage divider can be simply configured.

Furthermore, the voltage division controller may be configured to include a switching unit that establishes/interrupts conduction between the other end side of the voltage dividing resistor and a ground potential. The voltage division controller may interrupt the conduction between the other end side of the voltage dividing resistor and the ground potential by turning off the switching unit when the stop command is inputted, and ground the other end side of the voltage dividing resistor by turning on the switching unit when the execution command is inputted. In this manner, a changeover whether or not to perform the voltage division can be achieved simply by turning on/off the switching unit. The signal voltage divider, and the microcomputer-equipped system for electric power tool as a whole, can be simply configured.

The microcomputer-equipped system for electric power tool constituted as above may be mounted on a battery pack for electric power tool including at least one battery cell. More particularly, a second aspect of the present invention may provide a battery pack for electric power tool including at least one battery cell and the microcomputer-equipped system for electric power tool of the present invention. A battery voltage signal directly or indirectly indicating a voltage of at least one of the battery cells to the battery cell may be configured to be inputted to the AD port as the analog signal to be AD converted. The microcomputer may monitor a state of the battery cell based on a result of the AD conversion by the AD converter of the battery voltage signal.

According to the battery pack for electric power tool, even if the AD abnormal state has occurred and the voltage of the battery cell is AD converted to an incorrect value, the AD abnormal state can be reliably detected by the first or the second determiner. The microcomputer can be inhibited from continuing to monitor the state of the battery cell based on the incorrect value (voltage of the battery cell). Therefore, the battery pack for electric power tool can be provided with high reliability against abnormality (the AD abnormal state, in this case) of the microcomputer.

The battery pack for electric power tool including the microcomputer-equipped system for electric power tool provided with the second determiner, and at least one battery cell, may be more particularly configured as follows. A discharging circuit including a positive side resistor, a negative side resistor, and a switching unit may be connected to at least one of the battery cells. One end of the positive side resistor may be connected to a positive terminal of the battery cell. One end of the negative side resistor may be connected to a negative terminal of the battery cell. The switch unit may be connected to the other end of the respective resistors, and establish/interrupt conduction between the other ends of the resistors in accordance with the execution command and the execution command from the microcomputer. The microcomputer may be configured to monitor a voltage of the battery cell based on a result of AD conversion by the AD converter of a voltage outputted from the other end side of the positive side resistor to the AD port when the conduction between the other ends of the resistors is interrupted by the switching unit. The discharging circuit may function as the signal voltage divider. The discharging circuit may be configured to turn off the switching unit to directly output a voltage of the positive terminal of the battery cell to the AD port through the positive side resistor when the stop command is inputted, and to turn on the switching unit to divide the voltage of the positive terminal of the battery cell at the voltage dividing ratio by the respective resistors constituting the discharge circuit and generate the diagnostic analog signal when the execution command is inputted.

Also, the battery pack for electric power tool including the microcomputer-equipped system for electric power tool provided with the second determiner, and at least one battery cell, may be configured as follows. A discharging circuit including a positive side resistor, a negative side resistor, a switching unit, and a voltage dividing resistor, and a voltage detector are connected to at least one of the battery cells. One end of the positive side resistor may be connected to a positive terminal of the battery cell. One end of the negative side resistor may be connected to a negative terminal of the battery cell. The switch unit may be connected to the other end of the respective resistors, and establish/interrupt conduction between the other ends of the resistors in accordance with the execution command and the execution command from the microcomputer. The voltage dividing resistor may be provided in series with the switching unit between the other ends of the respective resistors. The microcomputer may be configured to monitor a voltage of the battery cell based on a result of AD conversion by the AD converter of a voltage outputted from the voltage detector to the AD port when the conduction between the other ends of the resistors is interrupted by the switching unit. The discharging circuit may function as the signal voltage divider, and may be configured to turn off the switching unit so that the voltage of the battery cell is directly inputted to the voltage detector when the stop command is inputted, and to turn on the switching unit to divide the voltage of the battery cell at the voltage dividing ratio by the respective resistors constituting the discharge circuit so that an output from the voltage detector to the divided voltage is generated as the diagnostic analog signal when the execution command is inputted.

In either of the above configurations, the charging circuit originally provided in the battery pack for electric power tool is used as the signal voltage divider. Therefore, if a discharge circuit is provided in the battery pack for electric power tool including the microcomputer-equipped system for electric power tool provided with the second determiner, part of the microcomputer-equipped system for electric power tool can be effectively configured by utilizing the charging circuit.

The above-described battery pack for electric power tool of the present invention may include various types of internal battery cells. For example, the battery pack for electric power tool can be configured to include a rechargeable battery, i.e., configured as a repeatedly chargeable battery pack for electric power tool.

In this case, the battery pack for electric power tool may further include a charging power input terminal through which a charging power for charging the rechargeable battery is inputted, and an interrupter that is provided on a charging power supply path from the charging power input terminal to the rechargeable battery and is capable of interrupting the charging power supply path by an interruption command from the microcomputer. The microcomputer, when it is determined by the first or the second determiner that the AD abnormal state has occurred, may output the interruption command to direct the interrupter interrupt the charging power supply path.

According to the battery pack for electric power tool constituted as above, in case that, for example, the AD abnormal state has occurred when charging to the rechargeable battery is being carried out, the microcomputer detects the generation of the AD abnormal state and interrupts the charging power supply path. Also, for example, in case that charging to the rechargeable battery is attempted when the AD abnormal state is already generated, the microcomputer can detect the generation of the AD abnormal state and interrupt the charging power supply path so that the charging is not carried out. Therefore, even if the AD abnormal state has occurred upon charging to the rechargeable battery, problems arising from the AD abnormal state (such as overcharging) can be kept from being generated. A highly reliable battery pack for electric power tool can be provided.

BRIEF DESCRIPTION OF THE DRAWINGS

Preferred embodiments of the present invention will be described hereinafter with reference to the accompanying drawings, in which.

DETAILED DESCRIPTION OF THE PREFERRED EMBODIMENTS

First Embodiment

Figure 1:
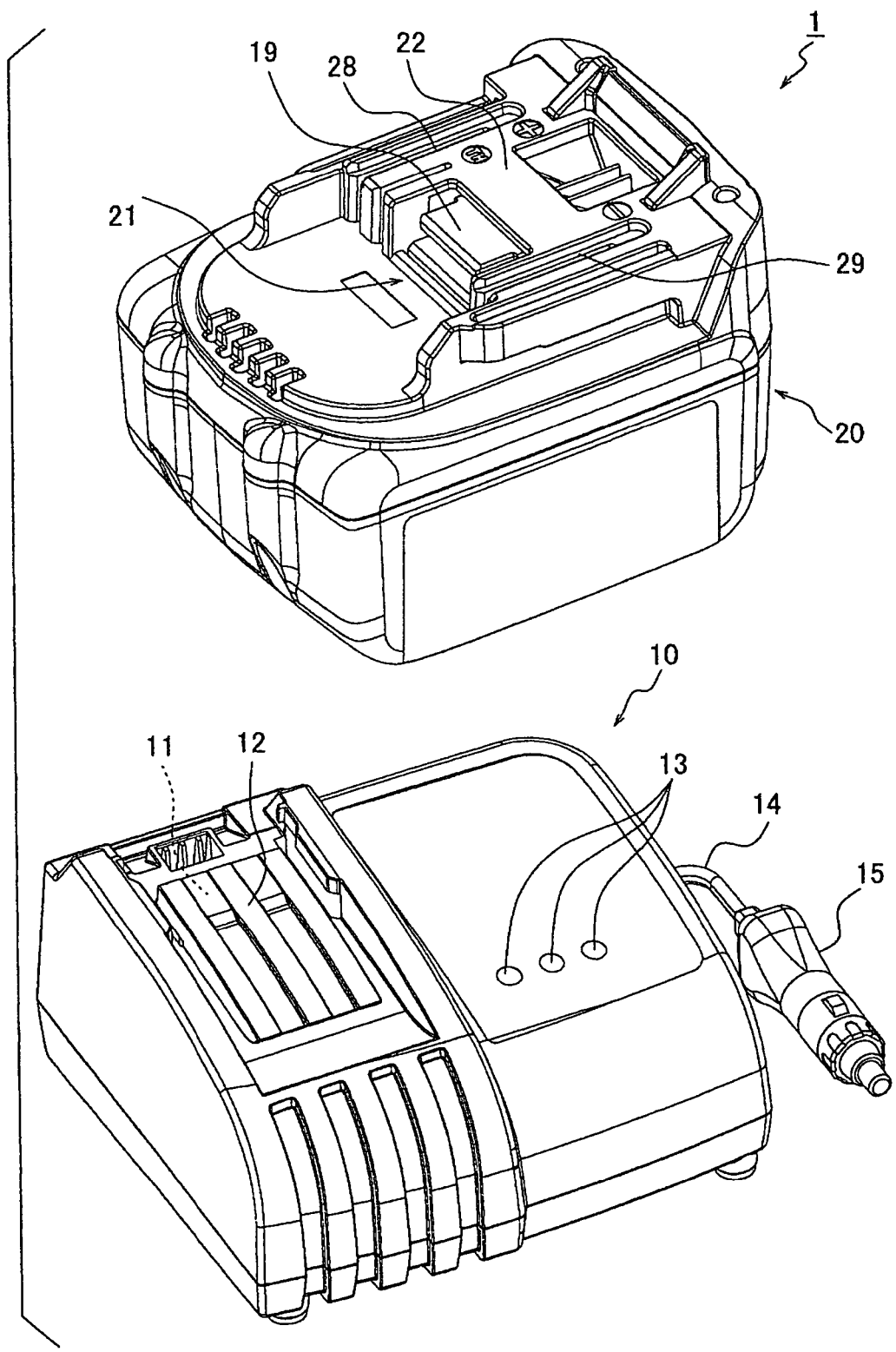
FIG. 1 is a perspective view of a charger and a battery pack which constitute a charging system of embodiments.

Referring to FIG. 1, a charging system 1 of the present embodiment includes a charger 10 and a battery pack 20. The charger 10 charges the battery pack 20 which is used as a power source of a power tool body 100 (see FIG. 2). The charging system 1 is configured to charge a rechargeable battery inside the battery pack 20 by the charger 10.

The charger 10 generates a charging direct current (DC) power having a predetermined voltage from a DC power of a DC power source 2 (see FIG. 2) leading to a cigarette socket of a not shown vehicle. The charger 10 is provided with a cigarette plug 15 to be connected to the cigarette socket for inputting to the charger 10 the DC power from a battery of the vehicle. When the cigarette plug 15 is inserted to the cigarette socket of the vehicle, a positive terminal and a negative terminal (both not shown) of the cigarette socket are connected to a plug side positive terminal 31 and a plug side negative terminal 32 (see FIG. 2) of the cigarette plug 15. Thereby, the DC power is inputted to the charger 10 via a power cord 14.

The charger 10 includes a charger side attachment portion 12 on one end side of its upper surface. The battery pack 20 is attached to the charger side attachment portion 12. A charger side terminal 11 is provided at a predetermined position of the charger side attachment portion 12 (inside the charger side attachment portion 12). The charger side terminal 11 includes a charger side positive terminal 8 and a charger side negative terminal 9 (see FIG. 2) for supplying the charging DC power to the battery pack 20. The charger side terminal 11 also includes one or more of charger side signal terminals (not shown) for transmitting/receiving various signals to and from the battery pack 20. Also, the charger 10 is provided with a display portion 13 including a plurality of LEDs and the like for displaying an operation state of the charger 10, a charging state of the battery pack 20 and others, to the outside.

The battery pack includes a battery side attachment portion 22 on one side face. The battery side attachment portion 22 is attached to the charger side attachment portion 12 of the charger 10. A battery side terminal 21 is provided at a predetermined position of the battery side attachment portion 22. The battery side terminal 21 includes a battery side positive terminal 28 and a battery side negative terminal 29 for receiving the charging DC power supplied from the charger 10. The battery side terminal 21 also includes a battery side signal terminal 19 to be connected with the charger side signal terminal of the charger 10.

When the battery side attachment portion 22 of the battery pack 20 is attached to the charger side attachment portion 12 of the charger 10, both of the terminals 11, 21 are electrically connected. Thereby, an assembled battery 23 (see FIG. 2) inside the battery pack can be charged by the charger 10.

Upon supplying power of the battery pack 20 to an object for power supply such as an electric power tool and the like, the battery side attachment portion 22 is attached to a predefined attachment portion of the object electric power tool and the like. Thereby, the power of the battery pack 20 (power of the assembled battery 23) is supplied to the electric power tool and the like.

Figure 2:
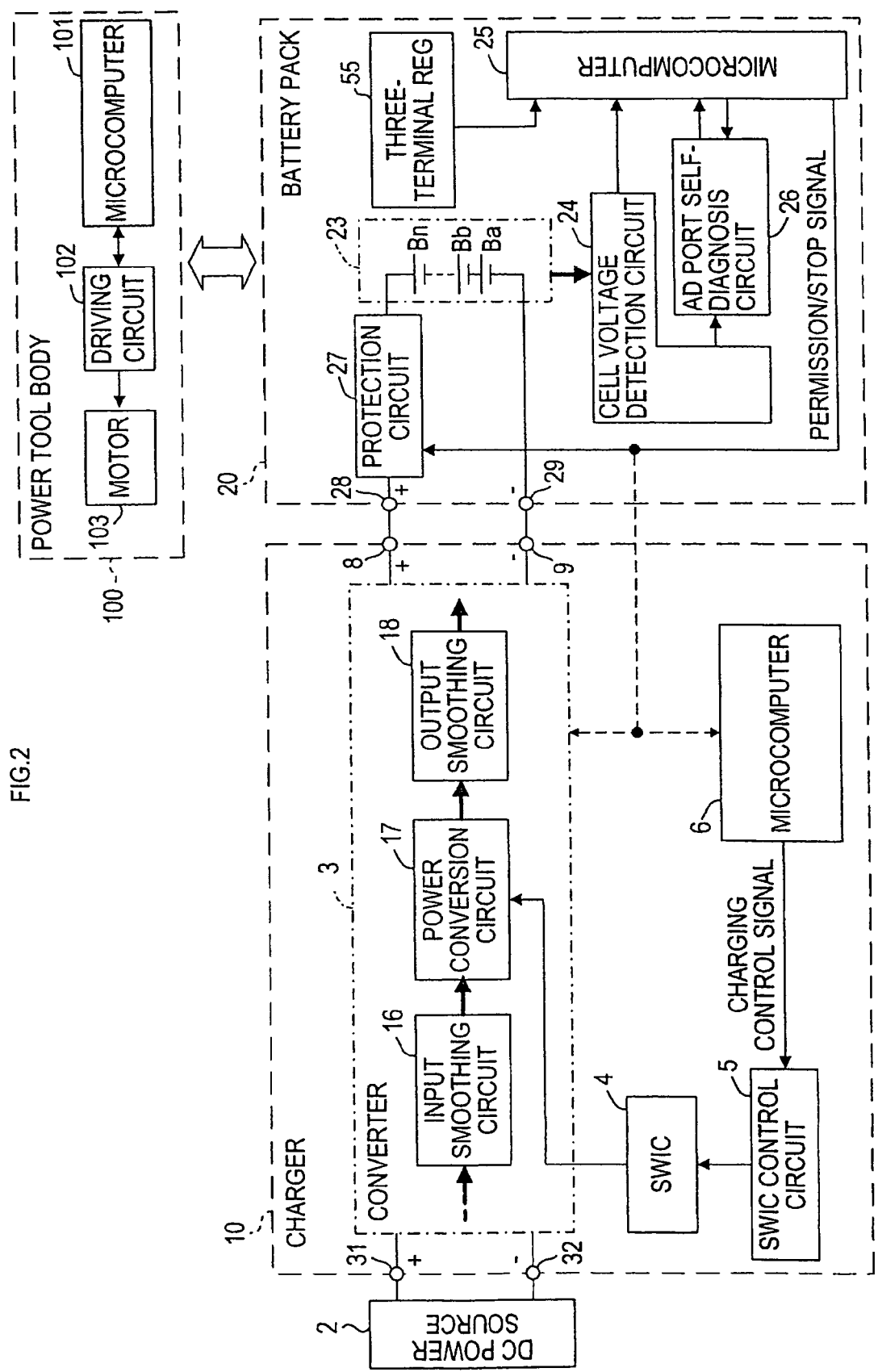
FIG. 2 is a block diagram showing a charging system and an power tool body of a first embodiment.

Now, referring to the block diagram in FIG. 2, particular description is given on the internal configuration of the charger 10 and the battery pack 20 which constitute the charging system 1, and a power tool body 100 which operates by the power of the battery pack 20.

The charger 10 includes, as shown in FIG. 2, a converter 3, a microcomputer 6, a switching IC (Integrated Circuit) 4, and a switching IC control circuit 5. The converter 3 converts the externally inputted DC power of the DC power source 2 to the charging DC power having a predetermined voltage for charging the assembled battery 23 inside the battery pack 20, and outputs the converted charging DC power. The microcomputer 6 controls overall operation of the charger 10, including the converter 3. The switching IC 4 controls on/off of a switching FET (not shown) inside a power conversion circuit 17 which constitutes the converter 3. The switching IC control circuit 5 controls operation of the switching IC 4 in accordance with a charging control signal from the microcomputer 6. Although not shown, the charger 10 also includes a constant voltage power circuit which generates a control power for operating various circuits inside the charger 10. The microcomputer 6 is also operated by the control power.

The converter 3 includes an input smoothing circuit 16, a power conversion circuit 17, and an output smoothing circuit 18. The input smoothing circuit 16 suppresses and smoothes voltage fluctuation of the inputted DC power. The power conversion circuit 17 converts (transforms) the DC power to an alternate current (AC) power. The output smoothing circuit 18 rectifies/smoothes the AC power converted by the power conversion circuit 17 to a DC power. The power conversion circuit 17 includes a transformer and a switching FET connected to one end of a primary winding of the transformer. The DC power is inputted to the primary winding of the transformer via the input smoothing circuit 16. The switching FET is turned on/off by an on/off signal from the switching IC 4 to intermittently pass a current (a kind of AC) to the primary winding of the transformer, thereby generating the AC power on a secondary winding of the transformer. The AC power is rectified/smoothed in the output smoothing circuit 18 to generate the charging DC power. The generated charging DC power is outputted to the battery pack 20.

The microcomputer controls on/off of the switching FET by the switching IC 4 via the switching IC control circuit 5, and further controls generation/output of the charging DC power to the battery pack 20.

The battery pack 20 includes, as shown in FIG. 2, the assembled battery 23 and the microcomputer 25 which performs various control inside the battery pack 20, including control for charging to the assembled battery 23 by the charger 10.

The assembled battery 23 includes a plurality of battery cells of Ba, Bb, . . . , Bn connected in series. Each battery cell is a lithium ion rechargeable battery in the present embodiment. Each of the battery cells constituting the assembled battery 23 being a lithium ion rechargeable battery is merely an example. The assembled battery 23 can be constituted from other kinds of rechargeable batteries.

The battery pack 20 includes a cell voltage detection circuit 24 for detecting a voltage of the assembled battery 23, and a voltage of each of the battery cells Ba, Bb, . . . , Bn constituting the assembled battery 23. The voltage of each battery cell detected by the cell voltage detection circuit 24 is inputted to AD port 45, 46, . . . , 47 (see FIG. 3) of the microcomputer 25 to be AD converted by an AD converter 42 (see FIG. 3) provided in the microcomputer 25. The microcomputer 25 monitors a state of each of the battery cells Ba, Bb, . . . , Bn based on results of the AD conversion.

The battery pack 20 of the present embodiment includes an AD port self-diagnosis circuit 26 for diagnosing the AD ports of the microcomputer 25 (in the present embodiment, diagnosing the AD port 45 to which the voltage of the battery cell Ba having a lowest potential among the battery cells Ba, Bb, . . . , Bn is inputted), that is, to be used by the microcomputer 25 itself to diagnose whether digital data for the voltage inputted to the AD port 45 is correctly obtained by the AD converter 42, i.e., an AD normal state has occurred, or is not correctly obtained, i.e., an AD abnormal state has occurred (hereinafter, referred to as "AD port self-diagnosis").

Moreover, the battery pack 20 of the present embodiment includes a three-terminal regulator 55 which generates a reference voltage Vref used when the microcomputer 25 itself diagnoses whether the AD converter 42 inside the microcomputer 25 operates normally, i.e., is in an AD normal state, or does not operate normally, i.e., is in an AD abnormal state (hereinafter, referred to as "AD converter self-diagnosis).

Details of the AD port self-diagnosis, including the configuration of the AD port self-diagnosis circuit 26, and the AD converter self-diagnosis executed by the microcomputer 25 will be later described.

Furthermore, the battery pack 20 of the present embodiment includes a protection circuit 27 on a charging power supply path from the battery side positive terminal 28 to which the charging DC power is inputted to a positive terminal (a positive terminal of the battery cell Bn having a highest potential) of the assembled battery 23 for interrupting the charging power supply path. The protection circuit 27 operates in accordance with a permission signal or a stop signal inputted from the microcomputer 25.

The battery pack 20 of the present embodiment is configured such that the battery side positive terminal 28, to which the charging DC power is inputted from the charger 10, is also used as a power output positive terminal for supplying power to the power supply object such as the electronic power tool and the like. It should be noted that such configuration is merely an example. The positive terminal for supplying power to the electronic power tool and the like may be provided separately from the battery side positive terminal 28 for charging.

The power tool body 100 receives power supply from the battery pack 20 and operates when the battery pack 20 is attached to the power tool body 100. The power tool body 100 includes a microcomputer 101, a motor 103, and a driving circuit 102. The microcomputer 101 controls the whole system inside the power tool body 100. The motor 103 rotationally drives a not shown tool bit. The driving circuit 102 drives the motor 103 based on a command from the microcomputer 101.

Figure 3:
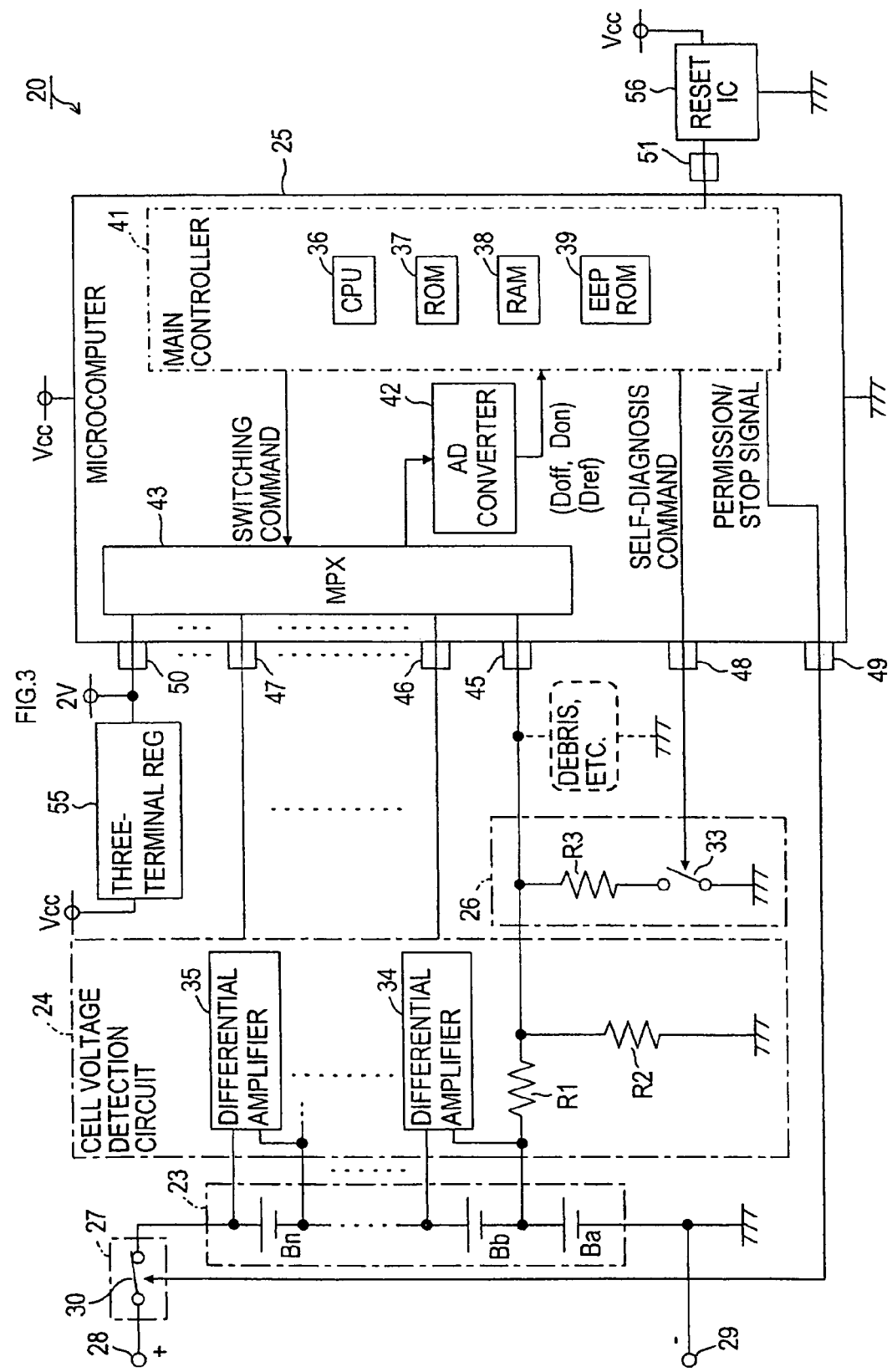
FIG. 3 is an electrical circuit diagram showing a configuration of a battery pack of the first embodiment.

From now on, referring to FIG. 3, description is given on the more particular configuration of the battery pack 20 which constitutes the charging system 1 of the present embodiment.

The cell voltage detection circuit 24 is constituted from a circuit for detecting, and outputting to the microcomputer 25, the voltage of each of battery cells Ba, Bb, . . . , Bn. For details, a voltage divider circuit constituted from resistors R1 and R2 is provided for the battery cell Ba having a lowest potential in order to divide the voltage of the battery cell Ba (i.e., the potential of the positive terminal of the battery cell Ba) and output the divided voltage to the AD port 45 of the microcomputer 25 as a battery voltage signal indicating the voltage of the battery cell Ba. Resistances of the respective resistors R1, R2 are, for example, several MΩ.

For the other cells Bb, . . . , Bn connected in series on the positive terminal side of the battery cell Ba, differential amplifiers 34, . . . , 35 are provided respectively. The voltage outputted from each of the differential amplifiers 34, . . . , 35 is inputted to each of the corresponding AD port 46, . . . , 47 in the microcomputer 25. Although not shown, between the positive terminal and the negative terminal of each of the respective battery cells Ba, Bb, . . . , Bn and also between the positive terminal of the battery cell Bn having a highest potential and the negative terminal of the battery cell Ba having a lowest potential, a capacitor is respectively provided for noise reduction.

Although not shown, the battery pack 20 includes a constant voltage power circuit that generates a control power having a constant voltage (5V, in the present embodiment) of a control power source Vcc for operating various circuits inside the battery pack 20. The microcomputer 25 is also operated by the control power of the control power source Vcc.

The three-terminal regulator 55 is a power source provided separately from an operation power source of the microcomputer 25. The three-terminal regulator 55 receives the control power of the control power source Vcc which is also the operation power source of the microcomputer 25, and generates the reference voltage Vref for use in AD converter self-diagnosis. In the present embodiment, a constant voltage of 2V is generated as the reference voltage Vref. Accordingly, even if the voltage of the control power source Vcc is lowered due to some abnormality, the three-terminal regulator 55 is able to generate the reference voltage of 2V in a stable manner as long as a voltage inputted to the three-terminal regulator 55 is within a minimum range (of 2.5V or above, for example) required to generate the reference voltage of 2V.

The reference voltage Vref generated in the three-terminal regulator 55 is inputted to a reference voltage input port 50 which is one of the AD ports provided in the microcomputer 25, and to the AD converter 42 via a multiplexer 43.

The microcomputer 25 has a general configuration including a main controller 41, the AD converter 42, and the multiplexer (MPX) 43, as hardware. The main controller 41 includes a CPU 36, a ROM 37, a RAM 38, an EEPROM 39 and others. The AD converter 42 converts an inputted analog signal to digital data. The multiplexer 43 selectively inputs to the AD converter 42 one of battery voltage signals inputted to the respective AD ports 45, 46, . . . , 47 and the reference voltage Vref inputted to the reference voltage input port 50 based on a switching command from the main controller 41.

As a result of the above constitution, the voltages (battery voltage signals) of the respective battery cells Ba, Bb, . . . , Bn inputted from the cell voltage detection circuit 24 to the respective AD ports 45, 46, . . . , 47 to be sequentially inputted to the AD converter 42 via the multiplexer 43 are sequentially AD converted by the AD converter 42. The AD converted digital data (hereinafter, referred to as "battery voltage data") is inputted to the main controller 41.

The main controller 41 monitors the state of each of the battery cells Ba, Bb, . . . , Bn based on the AD converted battery voltage data. Particularly, the main controller 41 monitors whether or not each of battery cells Ba, Bb, . . . , Bn is in an overcharged or overdischarged state, and also monitors the AD port self-diagnosis.

The battery pack 20 also includes a reset IC 56 for resetting (initializing) the microcomputer 25. The reset IC 56 receives the control power of the control power source Vcc, and outputs a reset signal to the microcomputer 25 when the voltage of the control power of the control power source Vcc is equal to a reset voltage (3V in the present embodiment) or below. The reset signal from the reset IC 56 is inputted to the main controller 41 via a reset signal input port 51. In other words, the reset IC 56 is configured to monitor the voltage of the control power source Vcc which is the operation power source of the microcomputer 25 and, when the voltage of the control power source Vcc is lowered to a voltage (3V or below) that hinders normal operation of the microcomputer 25, resets the microcomputer 25.

Accordingly, the three-terminal regulator 55 can generate the reference voltage of 2V in a stable manner while at least the microcomputer 25 operates normally (i.e., while the voltage of the control power source Vcc is larger than the reset voltage of 3V).

Here, explanation will be given respectively on the AD port self-diagnosis function and the AD converter self-diagnosis function, which are characteristic functions owned by the battery pack 20 of the present embodiment.

Firstly, the AD port self-diagnosis function will be explained which is performed utilizing the AD port self-diagnosis circuit 26. If the AD port 45 is in a normal state, that is, in an AD normal state in which the battery voltage data for the battery voltage signal inputted to the AD port 45 is correctly obtained by the AD converter 42, digital data corresponding to a value obtained by dividing the voltage of the battery cell Ba by the resistors R1, R2 can be correctly obtained as the battery voltage data. On the other hand, as illustrated in FIG. 3, when debris (foreign substance like dust, water, and the like) is adhered to the AD port 45, a state is produced which is equivalent to a state in which resistance is applied between the AD port 45 and the ground. Therefore, the battery voltage signal inputted to the AD port 45 becomes different from the value obtained by dividing the voltage of the battery cell Ba by the resistors R1, R2. Consequently, the battery voltage data obtained by AD converting the value by the AD converter 42 also becomes different from correct data indicating the voltage of the battery cell Ba.

The microcomputer 25 of the present embodiment thus includes the AD port self-diagnosis function so as to detect the AD abnormal state deriving from such abnormality in the AD port 45. The battery pack 20 is provided with the AD port self-diagnosis circuit 26 for use in carrying out the AD port self-diagnosis. The AD port self-diagnosis circuit 26 is a circuit for further dividing the battery voltage signal indicating the voltage of the battery cell Ba having a lowest potential (i.e., a voltage at a connection point between the resistor R1 and the resistor R2 which constitute the voltage detection circuit 24) inputted to the AD port 45 corresponding to the battery cell Ba upon the AD port self-diagnosis. The AD port self-diagnosis circuit 26 includes a voltage dividing resistor R3 and a voltage divider switch 33.

One end of the voltage dividing resistor R3 is connected to the AD port 45 and the other end thereof is connected to one end of the voltage divider switch 33. The other end of the voltage divider switch 33 is connected to a ground line (grounded). Accordingly, when the voltage divider switch 33 is off, the other end of the voltage dividing resistor R3 is electrically open. The voltage of the battery cell Ba inputted to the AD port 45 as the battery voltage signal is a voltage divided by the resistors R1, R2 inside the cell voltage detection circuit 24. On the other hand, when the voltage divider switch 33 is on, the other end of the voltage dividing resistor R3 is grounded. Therefore, the voltage of the battery cell Ba inputted to the AD port 45 as the battery voltage signal is a voltage divided by the resistors R1, R2 inside the cell voltage detection circuit 24 and the voltage dividing resistor R3.

On/off of the voltage divider switch 33 is controlled by a self-diagnosis command outputted from the main controller 41 of the microcomputer 25 via the self-diagnosis command output port 48. Specifically, the main controller 41 outputs a stop command to turn off the voltage divider switch 33 as the self-diagnosis command during the normal time when the AD port self-diagnosis is not executed. When carrying out the AD port self-diagnosis, the main controller 41 outputs an execution command to turn on the voltage divider switch 33 as the self-diagnosis command.

In the above constitution, the AD port self-diagnosis by the microcomputer 25 is conducted as follows. Firstly, the microcomputer 25 outputs a stop signal from the self-diagnosis command output port 48 to turn off the voltage divider switch 33. An off-time voltage Vadoff which is the battery voltage signal inputted to the AD port 45 at the time is AD converted by the AD converter 42, thereby to obtain an off-time data Doff which is the battery voltage data corresponding to the current off-time voltage Vadoff. Assuming that the voltage of the battery cell Ba is Vb, the off-time voltage Vadoff is expressed by the following formula (1)

$$Vadoff = R2 \cdot Vb/(R1+R2) \quad (1)$$

The microcomputer 25, when obtaining the off-time data Doff which is the result of AD conversion of the off-time voltage Vadoff, subsequently outputs the execution command from the self-diagnosis command output port 48 to turn on the voltage divider switch 33. An on-time voltage Vadon, which is the battery voltage signal inputted to the AD port 45 when the voltage divider switch 33 is on, is AD converted by the AD converter 42, thereby to obtain an on-time data Don. The on-time voltage Vadon is expressed by the following formula (2)

$$Vadon = \{R2 \cdot R3/(R1 \cdot R2 + R2 \cdot R3 + R3 \cdot R1)\} \cdot Vb \quad (2)$$

As Vb is erased from the above formulas (1), (2), the relation between the off-time voltage Vadoff and the on-time voltage Vadon can be expressed by the following formula (3).

$$Vadon = \{R3(R1+R2)/(R1 \cdot R2 + R2 \cdot R3 + R3 \cdot R1)\} \cdot Vadoff \quad (3)$$

The above formula (3) is defined by the respective resistors R1, R2, and voltage dividing resistor R3 for dividing the voltage of the battery cell Ba to be inputted to the AD port 45.

Accordingly, if the digital data for the battery voltage signal inputted to the AD port 45 is in an AD normal state and can be correctly obtained by the AD converter 42, the above formula (3) can be satisfied between the off-time voltage Vadoff and the on-time voltage Vadon. Thereby, the above formula (3) (or a relation corresponding thereto) can be satisfied between the off-time data Doff and the on-time data Don. On the other hand, when debris and the like is adhered to the AD port 45 as illustrated in FIG. 3, the above formula (3) is not satisfied since a state is produced which is equivalent to a state in which resistance is applied between the AD port 45 and the ground.

The microcomputer 25 then determines whether or not the above formula (3) is satisfied based on the results of the AD conversion by the AD converter 42. If the above formula (3) is satisfied, it is determined that the AD converter 42 is in an AD normal state. If not, it is determined that the AD abnormal state has occurred. If determined that the AD abnormal state has occurred, a stop signal is outputted from the permission/stop signal output port 49 to the protection circuit 27 to interrupt the path from the battery side positive terminal 28 to the positive terminal of the assembled battery 23.

The protection circuit 27 includes an interruption switch 30 provided on the charging power supply path from the battery side positive terminal 28 to the positive terminal of the assembled battery 23. The microcomputer 25 generally outputs a permission signal to the protection circuit 27 to turn on the interruption switch 30, thereby making the charging power supply path conductive so as to enable charging to the assembled battery 23 or power output from the assembled battery 23 to the outside.

The microcomputer 25 monitors the state of each of the battery cells Ba, Bb, ..., Bn by receiving the voltage (battery voltage signal) of each of the battery cells Ba, Bb, ..., Bn via the AD converter 42 as previously noted. In case that an abnormal state such as an overcharged state and overdischarged state is detected in any one of the battery cells Ba, Bb, ..., Bn, a stop signal is outputted to the protection circuit 27 to turn off the interruption switch 30, thereby interrupting the charging power supply path to protect the battery cells Ba, Bb, ..., Bn.

Moreover, in the present embodiment, in case that the AD abnormal state is detected by the above-described AD port self-diagnosis, in addition to the abnormal state such as overcharging and discharging, the microcomputer 25 outputs an inhibition signal to turn off the interruption switch 30, thereby interrupting the charging power supply path.

The interruption switch 30 constituting the protection circuit 27 and the voltage divider switch 33 constituting the AD port self-diagnosis circuit 26 can be particularly configured as desired as long as the function of each switch can be achieved. In the present embodiment, both the switches 30 and 33 are configured by a MOSFET (Metal-Oxide Semiconductor Field-Effect Transistor).

As noted above, in the present embodiment, the microcomputer 25 carries out the AD port self-diagnosis and determines whether or not the AD port is in a normal state or in an abnormal state depending on whether or not the above formula (3) is satisfied. In order to easily determine whether the above formula (3) is satisfied or not in the microcomputer 25, the voltage dividing resistor R3 may satisfy the following formula (4).

$$R3 = R1 \cdot R2/(R1+R2) \quad (4)$$

If the voltage dividing resistor R3 is selected to satisfy the formula (4), the formula (3) can be expressed as the following formula (5).

$$Vadoff = 2 \cdot Vadon \quad (5)$$

In other words, determination by the microcomputer 25 on whether or not the formula (3) is satisfied is actually conducted by determining whether or not the formula (5) is satisfied in the present embodiment. Accordingly, the microcomputer 25 can easily perform the above determination process.

Subsequently, explanation will be given on the AD converter self-diagnosis function performed by using the reference voltage Vref generated by the three-terminal regulator 55. In the battery pack 20 of the present embodiment, the voltage of the control power source Vcc supplied to the microcomputer 25 is also supplied to the AD converter 42 inside the battery pack 20. The AD converter 42 performs AD conversion based on the voltage of the control power source Vcc. Therefore, when the voltage of the control power source Vcc is decreased from 5V at normal times, the operation voltage of the AD converter 42 is also decreased. Depending on the degree of the decrease, the AD conversion by the AD converter 42 may not be performed normally although the microcomputer 25 can still operate (normal digital data may not be obtained).

The microcomputer 25 of the present embodiment uses the constant reference voltage Vref which is independent of fluctuation of the voltage of the control power source Vcc generated by the three-terminal regulator 55 to diagnose whether the AD converter 42 is in an AD normal state in which correct digital data can be obtained from the AD converter 42 or an AD abnormal state has occurred in which correct digital data cannot be obtained. The detailed diagnostic manner will be later described by way of FIG. 4.

Figure 4:
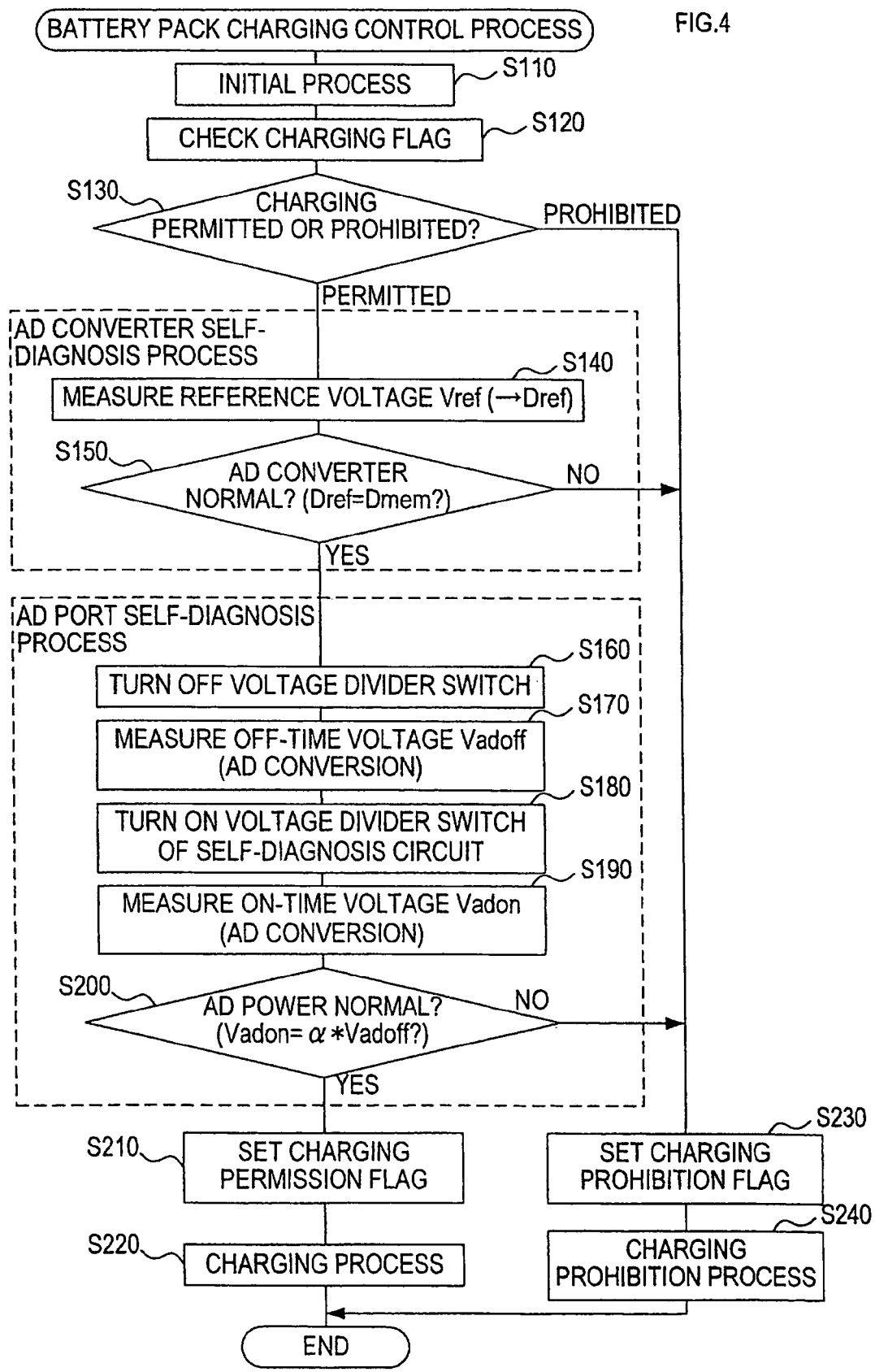
FIG. 4 is a flowchart showing a battery pack charging control process executed by a microcomputer inside the battery pack of the first embodiment.

Now, description will be given, based on FIG. 4, on a battery pack charging control process executed by the microcomputer 25 inside the battery pack 20 of the present embodiment constituted as above. Referring to FIG. 4, a battery pack charging control process program is stored in the ROM 37 in the microcomputer 25 inside the battery pack 20. When a predetermined condition is satisfied for charging the assembled battery 23, the CPU 36 reads the battery pack charging control process program from the ROM 37 to start charging the assembled battery 23 according to the program.

When the process is started, the microcomputer 25 firstly executes an initial process of various data (initialization of data, etc.) to start charging (S110). The microcomputer 25 checks the charging flag set in the EEPROM 39 (S120) to determine which one of a charging permission flag and a charging prohibition flag is set (S130).

If the charging prohibition flag is set, some abnormality (for example, overcharging, overdischarging, or the AD abnormal state) has already occurred/been detected. Therefore, the charging prohibition flag is set afresh (S230) and a charging prohibition process is performed (S240). In the charging prohibition process, particularly a stop signal is outputted from the permission/stop signal output port 49 thereby to turn off the interruption switch 30 inside the protection circuit 27 and interrupt the charging power supply path.

On the other hand, if the charging permission flag is set, charging to the assembled battery 23 is started. However, the charging is not immediately started but the AD converter self-diagnosis and AD port self-diagnosis processes are executed before starting the charging.

Specifically, the reference voltage Vref inputted from the three-terminal regulator 55 to the reference voltage input port 50 is firstly AD converted by the AD converter 42. Thereby, a reference voltage actual data Dref is measured (S140).

In the EEPROM 39 of the microcomputer 25, correct digital data for the reference voltage Vref of 2V is prestored as reference data Dmem. Specifically in the present embodiment, when the AD converter 42 is in a normal state (the voltage of the control power source Vcc is normal, that is, 5V), that is, when the battery pack 20 is being manufactured, the reference voltage Vref from the three-terminal regulator 55 is actually AD converted by the AD converter 42. The result of the AD conversion is stored in the EEPROM 39 as the reference data Dmem. Storing the reference data Dmem in the EEPROM 39 as such is only an example. The reference data (logical value in design) for the reference voltage Vref may be stored in advance, for example, in the ROM 37.

As noted above, the correct reference data Dmem for the reference voltage Vref of 2V is prestored in the EEPROM 39. Thus, after the reference voltage Vref is actually AD converted by the AD converter 42 to obtain the reference voltage actual data Dref in S140, it is determined whether or not the reference voltage actual data Dref is consistent with the reference data Dmem in the EEPROM 39 to determine whether the AD converter 42 is in the AD normal state or the AD abnormal state has occurred (S150).

If the reference voltage actual data Dref is not consistent with the reference data Dmem and it is determined that the AD abnormal state has occurred (S150: NO), the charging is stopped by the steps of S230 and S240. On the other hand, if the reference voltage actual data Dref is consistent with the reference data Dmem in the EEPROM 39 and it is determined that the AD converter 42 is in the AD normal state (S150: YES), the AD port self-diagnosis is executed.

Specifically, a stop command is first outputted from the self-diagnosis command output port 48 to the AD port self-diagnosis circuit 26 to turn off the voltage divider switch 33 (S160). Then, the battery voltage signal (off-time voltage Vadoff) of the battery cell Ba inputted to the AD port 45 at the time is measured (S170). In other words, the off-time voltage Vadoff is AD converted by the AD converter 42 to obtain the off-time data Doff. Subsequently, an execution command is outputted from the self-diagnosis command output port 48 to the AD port self-diagnosis circuit 26 to turn on the voltage divider switch 33 (S180). Then, the battery voltage signal (on-time voltage Vadon) of the battery cell Ba inputted to the AD port 45 at the time is measured (S190). In other words, the on-time voltage Vadon is AD converted by the AD converter 42 to obtain the on-time data Don.

Based on the obtained off-time data Doff and on-time data Don, it is determined whether or not the off-time voltage Vadoff and the on-time voltage Vadon satisfy the above formula (3). Thereby, it is determined whether or not the AD port 45 is normal, i.e., whether the AD port 45 is in the AD normal state or the AD abnormal state has occurred (S200). The sign a in S200 in FIG. 4 is a coefficient of Vadoff in the right-hand side of the formula (3). In the present embodiment, $\alpha = \frac{1}{2}$ in practice (see the formula (5)).

When the above formula (3) is satisfied and it is determined that the AD port 45 is in the AD normal state, the charging permission flag is set in the EEPROM 39 (S210). A charging process is started (S220). Particularly, a stop signal is outputted again to turn off the voltage divider switch 33. Then, the charging to the assembled battery 23 is started.

On the other hand, if the above formula (3) is not satisfied and it is determined that the AD abnormal state has occurred, the charging prohibition flag is set in the EEPROM 39 (S230). A charging prohibition process is executed. Specifically, the interruption switch 30 inside the protection circuit 27 is turned off to interrupt the charging power supply path (S240).

In the battery pack charging control process in FIG. 4, the AD converter self-diagnosis process (S140-S150) is firstly executed as the self-diagnosis before starting the charging. Thereafter, the AD port self-diagnosis process (S160-S200) is executed. This order can be reversed. In the process in FIG. 4, if it is determined that the AD abnormal state has occurred in either one of the self-diagnosis processes, the process moves to S230 and S240 to prohibit the charging. However, in case that the results of the both self-diagnosis processes show that the AD abnormal state has occurred, the process may move to S230 and the subsequent steps to prohibit the charging.

In the determination step of S150, when Dref is completely consistent with Dmem, it may be determined that the AD converter 42 is in the AD normal state. However, an allowable range to some extent may be provided, in consideration of a resolution of the AD converter 42, an error of the reference voltage Vref generated by the three-terminal regulator 55, and so on. In other words, even if Dref is not completely consistent with Dmem, it may be determined that the AD converter 42 is in the AD normal state if a difference is within the predetermined allowable range.

As described in the above, in the battery pack 20 of the present embodiment, the three-terminal regulator 55 is provided for self-diagnosis. Also, the reference data Dmem, which is the correct digital data corresponding to the reference voltage Vref generated in the three-terminal regulator 55, is prestored in the EEPROM 39. The reference voltage actual data Dref obtained by actually AD converting the reference voltage Vref by the AD converter 42 is compared with the reference data Dmem in the EEPROM 39. If Vref is consistent with Dmem, it is determined that the AD converter 42 is in the AD normal state. If not, it is determined that the AD abnormal state has occurred.

In the battery pack 20 of the present embodiment, the AD port self-diagnosis circuit 26 including the voltage dividing resistor R3 and the voltage divider switch 33 is provided on the path from the battery cell Ba having a lowest potential in the assembled battery 23 to the AD port 45 of the microcomputer 25 via the cell voltage detection circuit 24. The microcomputer 25 performs the AD port self-diagnosis for the AD port 45. In the AD port self-diagnosis, the off-time voltage Vadoff indicating the voltage of the battery cell Ba at normal times when the voltage divider switch 33 is off is firstly measured by the AD converter 42. Subsequently, the on-time voltage Vadon indicating the voltage of the battery cell Ba at normal times when the voltage divider switch 33 is turned on is measured by the AD converter 42. Then, it is determined whether or not the measured voltages Vadoff and Vadon satisfy the above formula (3) (the formula (5) in practice) based on the respective AD converted data Don and Doff.

According to the battery pack 20, the AD converter self-diagnosis is performed based on a result of comparison between the reference data Dmem that is the correct digital data corresponding to the reference voltage Vref and the reference voltage actual data Dref which is the result of actual AD conversion. Therefore, it is not necessary to provide a protective IC separate from the microcomputer 25 as in the conventional technique. In the case of the AD abnormal state, the microcomputer 25 itself can detect the AD abnormal state with high precision.

Especially, abnormality can be reliably determined in case that the cause of the AD abnormality is due to abnormality in the AD converter 42 itself. Specifically, one of the causes why the AD converter 42 itself becomes abnormal may be a decrease in the voltage of the control power source Vcc supplied to the microcomputer 25 as noted above. When the voltage of the control power source Vcc is decreased, the AD converter 42 included in the microcomputer 25 cannot carry out AD conversion correctly. On the other hand, the three-terminal regulator 55 that generates the reference voltage Vref is separately provided from the power source of the microcomputer 25. Therefore, abnormality in the AD converter 42 itself can be correctly determined by using the reference voltage Vref.

In the present embodiment, the value of the reference voltage Vref generated by the three-terminal regulator 55 is set to 2V which is smaller than the reset voltage of 3V which the microcomputer 25 is reset to. Even if the voltage of the control power source Vcc is decreased to 3V, the three-terminal regulator 55 can stably generate the reference voltage Vref of 2V. In other words, as long as the voltage of the control power source Vcc of the microcomputer 25 is normal, that is, does not become 3V or lower (as long as the microcomputer 25 can operate without being reset), the three-terminal regulator 65 can stably generate the reference voltage Vref of 2V. Therefore, independent from the fluctuation of the voltage of the control power source Vcc, the microcomputer 25 can perform the AD converter self-diagnosis with precision.

According to the battery pack 20 of the present embodiment, in the AD port self-diagnosis, the microcomputer 25 itself turns on/off the voltage pressure switch 33 inside the AD port self-diagnosis circuit 26 by the self-diagnosis command (an execution command and a stop command) to measure the off-time voltage Vadoff (obtain the off-time data Doff) and measure the on-time voltage Vadon (obtain the on-time data Don). Based on the respective measurement results, whether or not the AD abnormal state has occurred is determined. Therefore, if the AD converter 42 itself is normal but a normal AD conversion result is unable to be obtained due to adhesion of debris and the like to the AD port 45, such abnormal state can be precisely detected.

Moreover, the protection circuit 27 including the interruption switch 30 is provided. When it is determined, upon starting the charging to the assembled battery 23, that the AD abnormal state has occurred, the microcomputer 25 turns off the interruption switch 30 to interrupt the charging power supply path.

Accordingly, even if the AD abnormal state has already occurred upon starting the charging, problems arising from the AD abnormal state (such as overcharging) can be kept from being generated. The battery pack 20 can be provided which is highly reliable against the AD abnormal state.

Only a simple circuit including the voltage dividing resistor R3 and the voltage divider switch 33 may be provided in the AD port to be diagnosed (the AD port 45, in the present embodiment), as the hardware configuration necessary for carrying out the AD port self-diagnosis. Also, the self-diagnosis command output port 48 that outputs the self-diagnosis command for turning on/off the voltage divider switch 33 may be provided in the microcomputer 25. Based on the respective AD conversion results when the voltage divider switch 33 is on and off, whether or not the AD abnormal state has occurred can be determined. Thus, with a simple configuration, precise determination can be achieved.

Second Embodiment

Figure 5:
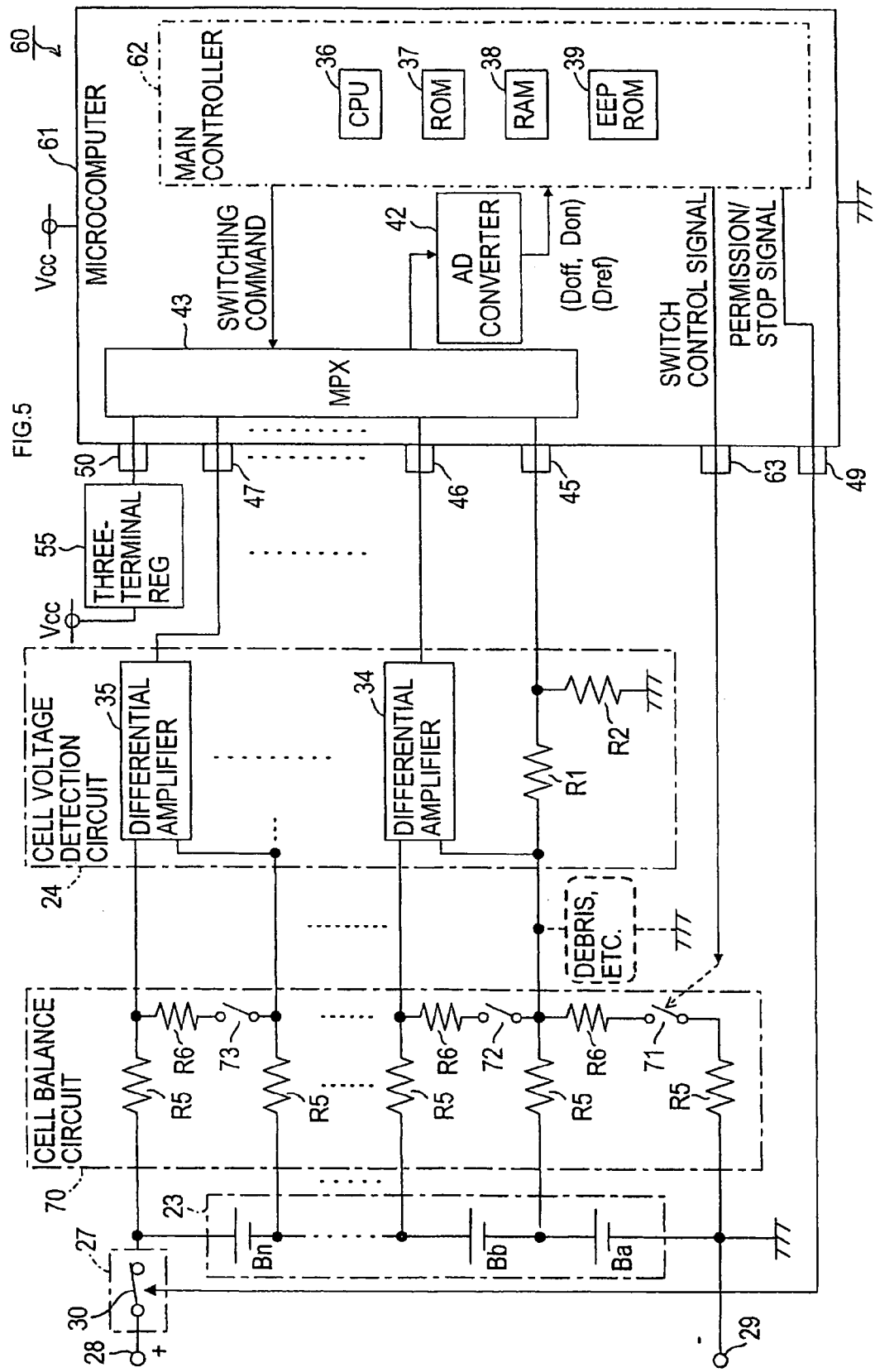
FIG. 5 is an electrical circuit diagram showing a configuration of a battery pack of a second embodiment.

Referring to FIG. 5, a battery pack 60 of the present embodiment, similar to the battery pack 20 of the first embodiment, is configured such that the internal assembled battery 23 is capable of being charged by the charging DC power from the charger 10. The outer shape of the battery pack 60 is also the same as that of the battery pack 20 shown in FIG. 1. The battery pack 60 of the present embodiment is different from the battery pack 20 of the first embodiment in that the AD port self-diagnosis circuit 26 is not provided but a cell balance circuit 70 is provided between the assembled battery 23 and the cell voltage detection circuit 24. Except for the above difference, the battery pack 60 of the present embodiment basically has the same configuration as the battery pack 20 of the first embodiment. Therefore, the same reference signs used in the first embodiment are given to the same components as those in the first embodiment, and the description thereof is not repeated. Hereinafter, particular description will be given on the configuration different from that of the first embodiment.

The cell balance circuit 70 is for reducing internal capacity (discharging electricity) of each of the battery cells Ba, Bb, . . . , Bn constituting the assembled battery 23. The cell balance circuit 70 includes resistors R5 and switches 71, 72, . . . , 73. Each of the resistors R5 is connected to each path from the positive terminal and the negative terminal of each of the battery cells Ba, Bb, . . . , Bn to the cell voltage detection circuit 24. The switches 71, 72, . . . , 73 are provided for each of the battery cells Ba, Bb, . . . , Bn. Each of the switches 71, 72, . . . , 73 is a switch for discharging electricity of each of the battery cells Ba, Bb, . . . , Bn via the resistor R5 respectively connected to the positive terminal and the negative terminal of each of the battery cells Ba, Bb, . . . , Bn. As shown in FIG. 5, each of resistors R6 is connected in series with each of the switches 71, 72, . . . , 73.

Specifically, the resistor R5 is connected to the negative terminal of the battery cell Ba having a lowest potential. Another resistor R5 is also connected to the positive terminal of the battery cell Ba (i.e., the negative terminal of the battery cell Bb) as well. The other ends of the resistors R5 respectively connected to the positive terminal/negative terminal are connected by a series circuit constituted from the resistor R6 and the switch 71. Accordingly, when the switch 71 is turned on, a closed circuit is formed from the positive terminal to the negative terminal of the battery cell Ba via the resistor R5, the resistor R6, the switch 71, and the another resistor R5. Thereby, electric discharge is performed. The same applies to the other battery cells Bb, . . . , Bn. By turning on each of the corresponding battery cells Bb, . . . , Bn and forming a closed circuit, electricity of the corresponding battery cell can be discharged. Each of the switches 71, 72, . . . , 73 can be particularly configured in various forms. In the present embodiment, all the switches 71, 72, . . . , 73 are configured from MOSFETs.

Now, simple description will be given on a cell balance function basically owned by the cell balance circuit 70. As in the present embodiment, when a charge/discharge cycle is repeated in the assembled battery 23 in which a plurality of battery cells made from lithium ion rechargeable batteries are connected in series, all the battery cells become deteriorated in the same manner if, for example, an ambient temperature at the time of charging/discharging is the same. If the temperature of the certain battery cell becomes higher, an amount of discharge, etc. of the battery cell is increased as compared to the other battery cells. As a result, the remaining capacity of the battery in the certain battery cell becomes smaller. Unbalance in capacity occurs.

If such unbalance in capacity occurs between the battery cells, the battery cell having a smaller capacity first becomes empty upon discharging as the charging/discharging is repeated. Therefore, if the discharging is continued, the battery cell having a smaller capacity becomes an overdischarged state. The battery cell is deteriorated quicker than the other cells and a chargeable capacity becomes small. Also, upon the charging, the battery cell having a smaller capacity first becomes full. Nevertheless, if the charging is continued until the other battery cells become full, the battery cell having a smaller capacity becomes an overcharged state. If such overcharging state and overdischarging state are continued, deterioration of only the battery cell having a smaller capacity is advanced. Soon the whole assembled battery become unable to be used due to presence of the deteriorated battery cell although all the other battery cells are normal. The unbalance in capacity of the battery cell may not be limited to the above described deterioration but may be caused due to individual variability of the battery cells themselves.

Thus, a microcomputer 61, which monitors the voltage of each of the battery cells Bb, . . . , Bn, turns on the respective switches 71, 72, . . . , 73 (which are normally off) as required based on the voltage of each battery cell to balance the capacity/voltage of the respective battery cells Bb, . . . , Bn, so that the certain battery cell is not overcharged or overdischarged. This is the cell balance function using the cell balance circuit 70 by the microcomputer 61.

On/off of the respective switches 71, 72, . . . , 73 in the cell balance circuit 70 is controlled by a switch control signal outputted from a switch control signal output port 63 of the microcomputer 61. The switches 71, 72, . . . , 73 are normally off. The microcomputer 61 monitors the voltage of each of the battery cells Bb, . . . , Bn when the switches 71, 72, . . . , 73 are off. At the time of execution of the cell balance function or execution of later-described AD port self-diagnosis, any one of the switches is selectively turned on.

In the present embodiment, the cell balance circuit 70 is not only used to achieve the basic operation of cell balance, but also used for the AD port self-diagnosis, through which whether or not digital data corresponding to an analog signal inputted to the respective AD ports 45, 46, . . . , 47 can be correctly obtained by the AD converter 42 is diagnosed.

As for the AD port self-diagnosis function, there is a method of using the AD port self-diagnosis circuit 26 already described in the first embodiment. The AD port self-diagnosis circuit 26 of the first embodiment may be adopted in the present embodiment as well. However, resistors having a small resistance (e.g., 10Ω-1 kΩ) are used for the resistors R5, R6 constituting the cell balance circuit 70 so that appropriate discharge can be performed upon executing the cell balance function. In contrast, the resistors R1, R2 constituting the cell voltage detection circuit 24 have a sufficiently larger resistance (e.g., several MΩ) than that of the resistors R5, R6 of the cell balance circuit 70. Therefore, if debris and the like is adhered to between the path from the cell balance circuit 70 to the cell voltage detection circuit 24 and the ground as shown in FIG. 5, the AD abnormal state due to adhesion of the debris and the like may not be able to be detected with high precision.

Thus, in the present embodiment, the cell balance circuit 70 is also utilized for the AD port self-diagnosis, so that the AD abnormal state due to adhesion of the debris and the like to the position shown in FIG. 5 can be detected with high precision. Particularly, each of the voltages at the time when each of the switches 71, 72, . . . , 73 are on and off is AD converted. Based on the result of the AD conversion, determination is made.

For example, when the switch 71 corresponding to the battery cell Ba having a lowest potential is off, the voltage of the battery cell Ba (voltage of the positive terminal) is outputted to the cell voltage detection circuit 24 via the resistor R5 without change. On the other hand, when the switch 71 is on, the voltage of the battery cell Ba is divided by the resistors R5 and R6 and outputted to the cell voltage detection circuit 24.

Accordingly, in case that the voltage detection circuit 24 is ignored for the sake of simple description, the off-time voltage Vadoff inputted to the AD port 45 when the switch 71 is off is the voltage Vb itself of the battery cell Ba. In contrast, the on-time voltage Vadon inputted to the AD port 45 when the switch 71 is on is expressed by a formula (6) below.

$$Vadon=\{(R5+R6)/(2 \cdot R5+R6)\} \cdot Vb \qquad (6)$$

Accordingly, a relation expressed by a formula (7) below is satisfied between the off-time voltage Vadoff and the on-time voltage Vadon.

$$Vadon=\{(R5+R6)/(2 \cdot R5+R6)\} \cdot Vadoff \qquad (7)$$

The above formula (7) is defined by the resistors R5, R6 for dividing the voltage of the battery cell Ba to be inputted to the AD port 45.

Accordingly, if the AD port 45 is in the AD normal state in which the digital data for the battery voltage signal inputted to the AD port 45 can be correctly obtained by the AD converter 42, the formula (7) should be satisfied between the off-time voltage Vadoff and the on-time voltage Vadon. Therefore, the formula (7) (or a relation corresponding to the formula (7)) is satisfied between the off-time data Doff and the on-time data Don. As illustrated in FIG. 5, if debris and the like is adhered to a signal path for outputting the voltage of the battery cell Ba to the microcomputer 61, the above formula (7) is not satisfied since a state has occurred equivalent to which resistance is applied between the signal path and the ground.

Thus, the microcomputer 61 determines whether or not the above formula (7) is satisfied based on the result of the AD conversion by the AD converter 42. If the formula (7) is satisfied, it is determined that the AD converter 42 is in the AD normal state. If not, it is determined that the AD abnormal state has occurred. If determined that the AD abnormal state has occurred, a stop signal is outputted from the permission/stop signal output port 49 to the protection circuit 27 thereby to interrupt the path from the battery side positive terminal 28 to the positive terminal of the assembled battery 23.

In the present embodiment, the AD port self-diagnosis can be performed in the same manner for the AD port 46, . . . , 47 corresponding to the battery cells Bb, . . . , Bn other than the battery cell Ba having a lowest potential. For example, as for the battery cell Bn having a highest potential, the switch 73 is turned off first. The off-time voltage Vadoff inputted from the differential amplifier 35 to the AD port 47 at the time is AD converted by the AD converter 42 to obtain the off time data Doff. Subsequently, the switch 73 is turned on. The on-time voltage Vadon inputted from the differential amplifier 35 to the AD port 47 at the time is AD converted by the AD converter 42 to obtain the on-time data Don. Based on each of the obtained data Doff and Don, it is determined whether or not the above formula (7) is satisfied between the respective voltages Vadoff and Vadon. If the formula (7) is not satisfied, it is determined that the AD abnormal state has occurred.

An outline of the AD port self-diagnosis function in the present embodiment has been given in the above. Actually, the resistors R1, R2 in the cell voltage detection circuit 24 affect the self-diagnosis of the AD port 45 to which the voltage of the battery cell Ba having a lowest potential is inputted. However, even in consideration of the resistors R1, R2, a formula for determination for use in self-diagnosis results in the above formula (7) as explained below, since a relation that R5, R6<<R1, R2 is satisfied in the present embodiment.

Specifically, if the resistors R1, R2 of the cell voltage detection circuit 24 are taken into account, the off-time voltage Vadoff at the time when the switch 71 is off can be expressed as a formula (8) below.

$$Vadoff=\{R2/(R1+R2+R5)\} \cdot Vb \qquad (8)$$

Here, since there is a relation that R5, R6<<R1, R2, the above formula (8) can be deformed into a formula (9) below.

$$Vadoff=\{R2/(R1+R2)\} \cdot Vb \qquad (9)$$

The on-time voltage Vadon at the time when the switch 71 is on can be also expressed as a formula (10) below, if the resistors R1, R2 are taken into account.

$$Vadon=\{(R5+R6)/(2 \cdot R5+R6)\} \cdot \{R2/(R1+R2+R5)\} \cdot Vb \qquad (10)$$

Here, since there is a relation that R5, R6<<R1, R2, the above formula (10) can be deformed into a formula (11) below.

$$Vadon=\{(R5+R6)/(2 \cdot R5+R6)\} \cdot \{R2/(R1+R2)\} \cdot Vb \qquad (11)$$

Accordingly, from the above formulae (9) and (11), a formula (12) below is satisfied between the off-time voltage Vadoff and the on-time voltage Vadon.

$$Vadon=\{(R5+R6)/(2 \cdot R5+R6)\} \cdot Vadoff \qquad (12)$$

That is, the formula (12) is the same as the formula (7).

In the cell balance circuit 70, the resistors R6 are not necessary just for achieving the cell balance function. However, in the present embodiment; in order to achieve not only the cell balance function but also the AD port self-diagnosis function, the resistors R6 are inserted so that the battery voltage is divided by a predetermined voltage dividing ratio when each switch is on. However, since the voltage of the battery cell Ba having a lowest potential is not inputted to the differential amplifier, the resistor R6 connected to the switch 71 is not necessarily required.

Now, description will be given on a battery pack charging control process executed by the microcomputer 61 in the battery pack 60 of the present embodiment constituted as above, by way of FIG. 6.

Figure 6:
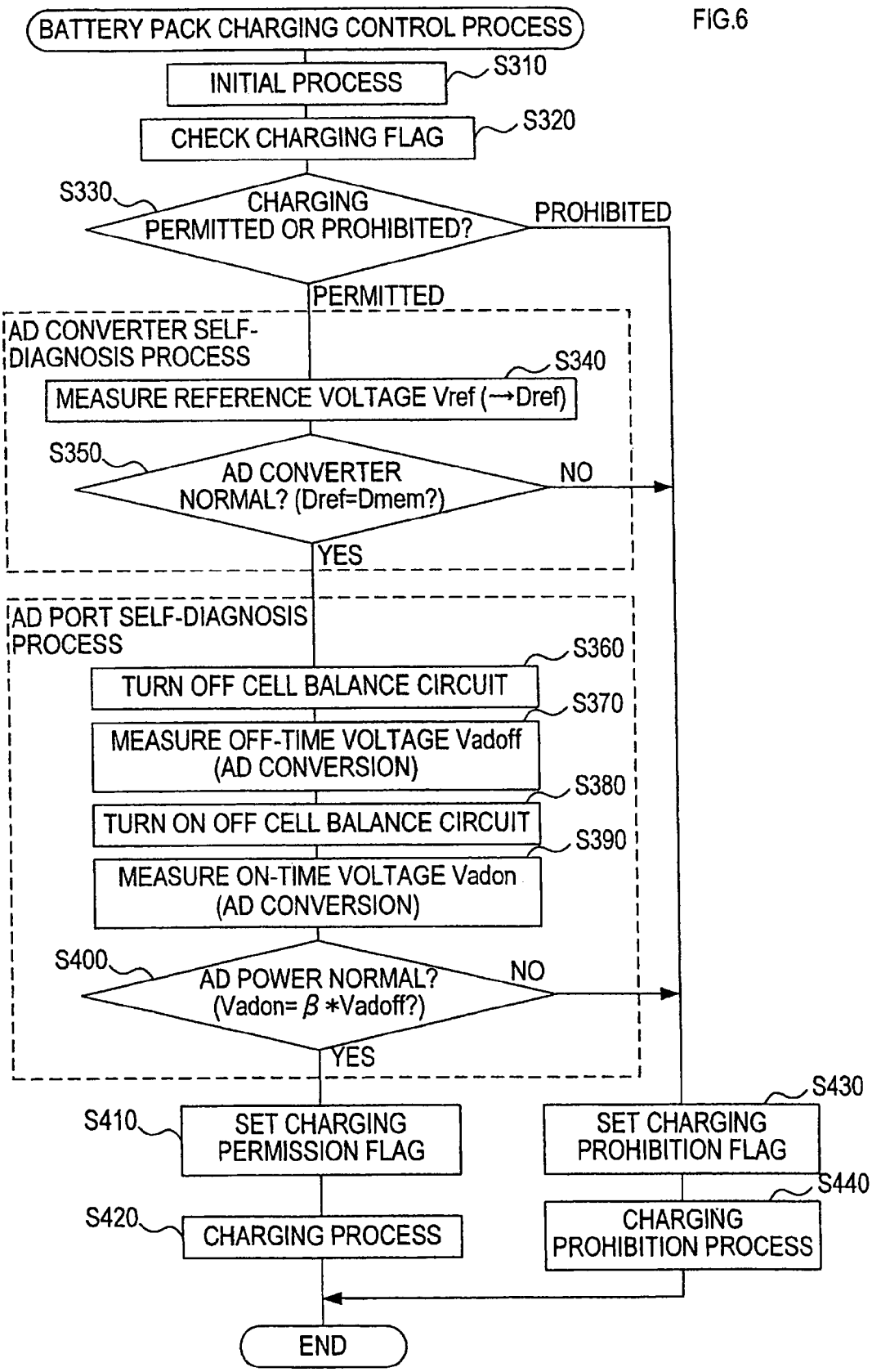
FIG. 6 is a flowchart showing a battery pack charging control process executed by a microcomputer inside the battery pack of the second embodiment.

In the battery pack charging control process in FIG. 6, the steps S310-S330 are the same as the step S110-S130 in the battery pack charging control process of the first embodiment shown in FIG. 4. Also, the AD converter self-diagnosis process of S340-S350 is the same as S140-S150 in FIG. 4. The steps S410-S440 are also the same as the steps S210-S240 in FIG. 4. Accordingly, the detailed descriptions on the same steps as those in FIG. 4 are not repeated. Detailed description will be given on the steps (S360-S400) in the AD port self-diagnostic process which are different from the steps in FIG. 4.

As shown in FIG. 6, in the AD port self-diagnosis process in the battery pack charging control process of the present embodiment, a stop signal is first outputted as the switch control signal from the switch control signal output port 63 to the cell balance circuit 70 to turn off the switch 71 (S360). In the initial state, all the switches 71, 72, . . . , 73 are off.

Then, the battery voltage signal (off-time voltage Vadoff) of the battery cell Ba inputted to the AD port 45 at the time when the switch 71 is off is measured (S370). Specifically, the off-time voltage Vadoff is AD converted by the AD converter 42 thereby to obtain the off-time data Doff. Subsequently, an execution command is outputted as the switch control signal from the switch control signal output port 63 to the cell balance circuit 70 to turn on the switch 71 (S380). The battery voltage signal (on-time voltage Vadon) of the battery cell Ba inputted to the AD port 45 at the time is measured (S390). Specifically, the on-time voltage Vadon is AD converted by the AD converter 42 thereby to obtain the on-time data Don.

Based on the obtained off-time data Doff and on-time data Don, it is determined whether or not the off-time voltage Vadoff and the on-time voltage Vadon satisfy the above formula (7), thereby determining whether or not the AD port 45 is normal, that is, whether the AD port 45 is in the AD normal state or the AD abnormal state has occurred (S400). The sign β in S400 in FIG. 6 is a coefficient of Vadoff in the right-hand side of the formula (7).

When the above formula (7) is satisfied and it is determined that the AD port 45 is in the AD normal state, the charging permission flag is set in the EEPROM 39 (S410). The charging process is started (S420). Particularly, after the switch 71 is again turned off, charging to the assembled battery 23 is started.

On the other hand, when the above formula (7) is not satisfied and it is determined that the AD abnormal state has occurred, the charging prohibition flag is set in the EEPROM 39 (S430). The charging prohibition process is executed, that is, the interruption switch 30 inside the protection circuit 27 is turned off to interrupt the charging power supply path (S440).

A series of the AD port self-diagnosis process (S360-S400) bounded by a dotted line in FIG. 6 is actually executed sequentially per each of the battery cells Ba, Bb, . . . , Bn constituting the assembled battery 23. When it is determined that the AD port 45 is in the AD normal state with respect to all the battery cells Ba, Bb, . . . , Bn, the process moves to the steps of and after S410. When it is determined that the AD abnormal state has occurred with respect to at least one of the battery cells Ba, Bb, . . . , Bn, the process moves to the steps of and after S430. Charging is stopped.

As described in the above, according to the battery pack 60 of the present embodiment, the AD port self-diagnosis is performed as well using the cell balance circuit 70 originally provided for the cell balance function in the battery pack 60. Therefore, the AD port self-diagnosis can be efficiently performed without the component only necessary for the AD port self-diagnosis.

[Variations]

Although the embodiments of the present invention have been described above, it is to be understood that the present invention should not be limited to the above embodiments, but may be embodied in various forms within the technical scope of the present invention.

For instance, the control power source Vcc is used as the input power source of the three-terminal regulator 55 in the above embodiments. This is only an example. As long as the desired reference voltage Vref (2V in the above embodiments) can be generated, there is no specific limitation to the input power source of the three-terminal regulator 55.

Figure 7:
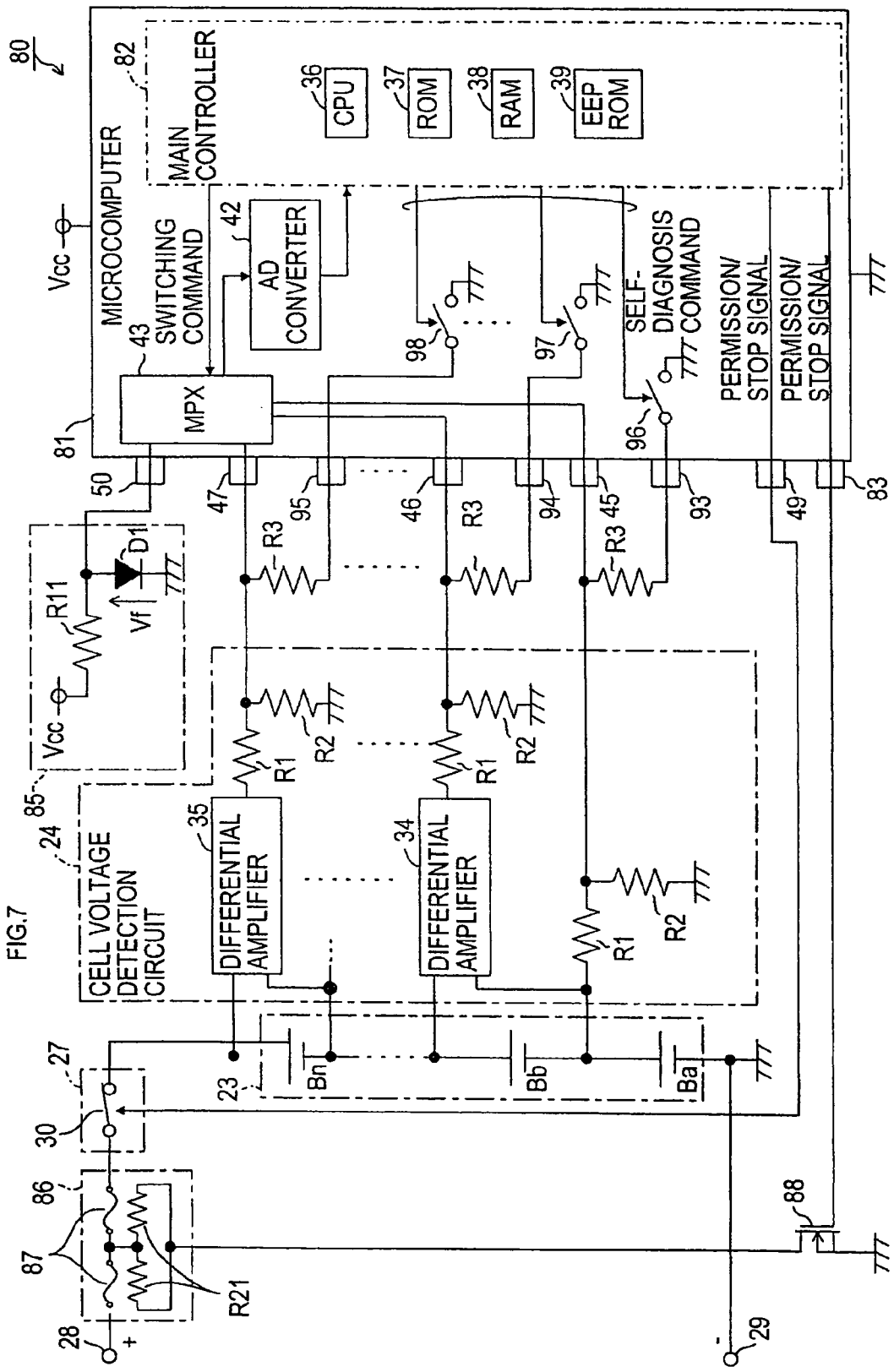
FIG. 7 is an electrical circuit diagram showing other example of a battery pack.

While the three-terminal regulator 55 is provided as the reference voltage source for generating the reference voltage Vref in the above embodiments, a simple reference voltage source 85 including a diode D1 may be provided instead of the three-terminal regulator 55, like a battery pack 80 shown in FIG. 7, for example. In the battery pack 80 shown in FIG. 7, the reference voltage source 85 includes the diode D1 of which cathode is grounded and anode is connected to the control power source Vcc via a resistor R11. Thereby, current flows in a forward direction through the diode D1. A forward-direction voltage Vf (≈0.6V) is generated between the anode and the cathode of the diode D1. The forward-direction voltage Vf is used as the reference voltage Vref for AD converter self-diagnosis.

As noted above, use of the forward-direction voltage Vf of the diode D1 as the reference voltage source can simplify the configuration of the reference voltage source and further simplify the whole battery pack 80.

Also, as shown in FIG. 7, a self control protector 86 may be provided in series with the protection circuit 27, on the charging power supply path from the battery side positive terminal 28 of the battery pack 80 to the positive terminal of the assembled battery 23. The self control protector 86 has an ordinary configuration which includes two fuses 87, 87 inserted in series on the charging power supply path and two heating resistors R21, R21 for melting down the respective fuses 87, 87. The microcomputer 81 includes two permission/stop signal output ports 49, 83. When it is determined that the AD abnormal state has occurred, a stop signal is outputted from each of the permission/stop signal output ports 49, 83 to turn off the interruption switch 30 inside the protective circuit 27 and turn on a FET 88 for operating the self control protector 86. Thereby, the heating resistors R21 constituting the self control protector 86 are heated. The fuses 87 are melted to interrupt the charging power supply path.

As noted above, the self control protector 86 is provided in addition to the protection circuit 27, and the self control protector 86 is operated to completely disable charging/discharging when the AD abnormal state has occurred. In this manner, the assembled battery 23 can be reliably protected from an abnormal state. A battery pack with higher reliability can be provided.

While the AD port self-diagnosis circuit 26 is constituted from the resistor R3 and the voltage divider switch 33 in the first embodiment, only the resistor R3 may be provided outside the microcomputer 81, and a voltage divider switch 96 for effecting the voltage division by the resistor R3 may be provided inside the microcomputer 81, as shown in FIG. 7. Specifically, the resistor R3 may be configured such that one end is connected to the AD port 45 and the other end is connected to a self-diagnosis port 93. The other end of the resistor R3 is connected to the voltage divider switch 96 inside the microcomputer 81 through the self-diagnosis port 93. The microcomputer 81 can execute the AD port self-diagnosis in completely the same manner as in the first embodiment, by controlling on/off of the voltage divider switch 96 inside by self-diagnosis commands (execution command/stop command).

The whole AD port self-diagnosis circuit including the resistor R3 may be included inside the microcomputer 81.

While the AD port self-diagnosis process is executed for the AD port 45 corresponding to the battery cell Ba having a lowest potential in the first embodiment, the AD port self-diagnosis process may be executed for the respective AD ports 46, . . . , 47 corresponding to the other battery cells Bb, . . . , Bn, as shown in FIG. 7, for example.

Specifically, as shown in FIG. 7, a voltage dividing circuit constituted from the resistor R1 and the resistor R2 is respectively provided on the output side of each of the differential amplifiers 34, . . . , 35 inside the cell voltage detection circuit 24, in the same manner as for the battery cell Ba having a lowest potential. The output side of each voltage dividing circuit is connected to each of the corresponding AD ports 46, . . . , 47 in the microcomputer 81 and to each of the corresponding self-diagnosis ports 94, . . . , 95 through the voltage dividing resistor R3. Each of the self-diagnosis ports 94, . . . , 95 is connected to each of voltage divider switches 97, . . . , 98 inside the microcomputer 81.

Constituted as such, each of the other voltage divider switches 97, . . . , 98 is respectively controlled in the same manner as the voltage divider switch 96 corresponding to the battery cell Ba having a lowest potential. Thereby, the self-diagnosis of the respective AD ports 45, 46, . . . , 47 corresponding to all the battery cells Ba, Bb, . . . , Bn can be executed.

Although the AD port self-diagnosis and the AD converter self-diagnosis are performed before the charging to the assembled battery 23 is started in the above embodiments, when to perform these self-diagnoses is not specifically limited. For example, the self-diagnoses may be performed periodically after the charging is started (during the charging), or may be periodically performed regardless of whether or not the charging is started.

If the self-diagnoses are executed also during the charging, the microcomputer can detect occurrence of the AD abnormal state during the charging and interrupt the charging power supply path. Overcharging and so on can be prevented from occurring.

In the above embodiments, the charging power supply path is interrupted by operating the protection circuit 27 inside the battery pack in the case of the AD abnormal state. In addition, supply of the charging power to the battery pack may be stopped in the charger 10. For example, when the AD abnormal state is detected in the battery pack, the stop signal outputted from the microcomputer inside the battery pack to the protection circuit 27 may be outputted also to the microcomputer 6 and the converter 3 inside the charger 10, as shown in a dotted arrow in FIG. 2. In the charger 10, when a stop signal is inputted, the microcomputer 6 may output a charging control signal to the switching IC control circuit 5 to stop charging. Or, a switch may be provided which interrupts the charging power supply path to the charger side positive terminal 8 in the converter 3 to interrupt the charging power supply path. In this manner, in the case of the AD abnormal state, reliability for the AD abnormal state can be enhanced not only by operating the protection circuit 27 inside the battery pack but also by stopping output of the charging DC power in the charger 10.

In the above embodiments, description is given on the battery pack provided with two types of the self-diagnosis functions, that is, the AD converter self-diagnosis function using the reference voltage Vref, and the AD port self-diagnosis function using the AD port self-diagnosis circuit 26 (in the first embodiment) or the cell balance circuit 70 (in the second embodiment). Alternatively, a battery pack may be provided, for example, only with the AD converter self-diagnosis function or only with the AD port self-diagnosis function.

In the above embodiments, the charger 10 which converts the DC power of the external DC power source 2 into a charging DC power having a predetermined voltage to be outputted is illustrated as the charger for charging the battery pack 20. Such charger 10 that receives the DC power from outside is only an example. The charger 10 may be configured to receive an AC power (e.g., commercial power source 100V) and converts the AD power into the charging DC current to be outputted.

In the above embodiments, the present invention is applied to the microcomputer inside the battery pack. Application of the present invention is not limited to the microcomputer inside the battery pack. The present invention may be applied, for example, to the microcomputer 6 inside the charger 10 or to the microcomputer 101 inside the power tool body 100. The present invention can be applied to any battery pack or charger for electric power tool, or power tool body, which is equipped with a microcomputer including an AD converter.

What is claimed is:

1. A microcomputer-equipped system for electric power tool, the system comprising:

a microcomputer that includes an AD (analog-to-digital) converter and at least one AD port to which an analog signal to be AD converted by the AD converter is inputted;

a reference voltage generator that is separately provided from an operation power source of the microcomputer and generates and inputs to the AD port a reference voltage having a predetermined value;

a reference data storage unit that prestores reference data which is digital data corresponding to the reference voltage;

a first determiner that is provided inside the microcomputer and compares diagnostic data obtained by AD conversion by the AD converter of the reference voltage inputted to the AD port with the reference data stored in the reference data storage unit to determine, in case that difference between the diagnostic data and the reference data is out of a predefined allowable range, that an AD abnormal state has occurred in which a correct result of the AD conversion is unable to be obtained from the AD converter;

a signal voltage divider that is provided on a signal path before the analog signal to be AD converted is inputted to the AD converter, and generates a diagnostic analog signal by voltage division of the analog signal at a predefined voltage dividing ratio when an execution command is inputted; and a second determiner that is provided inside the microcomputer, obtains the diagnostic data by directing the AD converter to AD convert the diagnostic analog signal when the voltage division is executed by the signal voltage divider, obtains a comparative data by directing the AD converter to AD convert the analog signal when the voltage division is not executed by the signal voltage divider, compares the obtained diagnostic data and the comparative data, and determines whether the AD abnormal state has occurred based on a result of the comparison.

2. The microcomputer-equipped system for electric power tool according to claim 1, wherein the reference voltage generator receives a predefined voltage of the operation power source supplied to the microcomputer, and generates the reference voltage lower than the predefined voltage of the operation power source.

3. The microcomputer-equipped system for electric power tool according to claim 2, further comprising:

a resetting unit that outputs a reset signal to the microcomputer when the voltage of the operation power source of the microcomputer becomes a predefined lower limit or smaller, wherein the microcomputer is configured such that its operation is initialized when the reset signal is inputted from the resetting unit, and the reference voltage generator generates as the reference voltage a voltage that is smaller than the lower limit and capable of being AD converted by the AD converter.

4. The microcomputer-equipped system for electric power tool according to claim 1, further comprising:

a command output unit that is provided inside the microcomputer and outputs to the signal voltage divider the execution command for directing the signal voltage divider execute the voltage division or a stop command for keeping the signal voltage divider from executing the voltage division, wherein the second determiner obtains diagnostic data by directing the command output unit to output the execution command to execute the voltage division by the signal voltage divider and directing the AD converter to AD convert the diagnostic analog signal obtained by the voltage division, obtains comparative data by directing the command output unit to output the stop command to stop the voltage division by the signal voltage divider and directing the AD converter to AD convert the analog signal, compares the obtained diagnostic data and the comparative data, and determines that the AD abnormal state has occurred when the diagnostic data and the comparative data do not satisfy a relation corresponding to the voltage dividing ratio in the signal voltage divider.

5. The microcomputer-equipped system for electric power tool according to claim 4, wherein a signal input circuit including at least one resistor connected in series is provided on the signal path till where the analog signal to be AD converted is inputted to the AD port, and the signal voltage divider is provided on the signal path from the signal input circuit to the AD converter, and generates the diagnostic analog signal by the voltage division of the analog signal to be AD converted inputted to the signal input circuit at the voltage dividing ratio when the execution command is inputted.

6. The microcomputer-equipped system for electric power tool according to claim 5, wherein the signal voltage divider includes:

a voltage dividing resistor, one end of which is electrically connected to the AD port; and a voltage division controller that makes the other end of the voltage dividing resistor electrically open when the stop command is inputted, and electrically connect the other end of the voltage dividing resistor to a region having a lower potential than the one end when the execution command is inputted, so as to pass a current to the voltage dividing resistor for the voltage division.

7. The microcomputer-equipped system for electric power tool according to claim 6, wherein the voltage division controller includes a switch that establishes/interrupts conduction between the other end of the voltage dividing resistor and a ground potential, interrupts the conduction between the other end of the voltage dividing resistor and the ground potential by turning off the switch when the stop command is inputted, and grounds the other end of the voltage dividing resistor by turning on the switch when the execution command is inputted.

8. The microcomputer-equipped system for electric power tool according to claim 4, wherein a discharging circuit including a positive side resistor, a negative side resistor, and a switching unit is connected to at least one battery cell, one end of the positive side resistor being connected to a positive terminal of the battery cell, one end of the negative side resistor being connected to a negative terminal of the battery cell, the switching unit being connected to the other ends of the respective resistors, and establishing/interrupting conduction between the other ends of the resistors in accordance with the execution command and the execution command from the microcomputer, the microcomputer is configured to monitor a voltage of the battery cell based on a result of AD conversion by the AD converter of a voltage outputted from the other end of the positive side resistor to the AD port when the conduction between the other ends of the resistors is interrupted by the switching unit, the discharging circuit functions as the signal voltage divider, and is configured to turn off the switching unit to directly output a voltage of the positive terminal of the battery cell to the AD port through the positive side resistor when the stop command is inputted, and to turn on the switching unit to divide the voltage of the positive terminal of the battery cell at the voltage dividing ratio by the respective resistors constituting the discharging circuit and generate the diagnostic analog signal when the execution command is inputted.

9. A battery pack for electric power tool comprising:

at least one battery cell, and the microcomputer-equipped system for electric power tool according to claim 4, wherein a battery voltage signal directly or indirectly indicating a voltage of the at least one battery cell to the battery cell is configured to be inputted to the AD port as the analog signal to be AD converted, and the microcomputer monitors a state of the battery cell based on a result of the AD conversion by the AD converter of the battery voltage signal.

10. The battery pack for electric power tool according to claim 9, wherein the at least one battery cell is a rechargeable battery.

11. The battery pack for electric power tool according to claim 10, further comprising:

a charging power input terminal through which a charging power for charging the rechargeable battery is inputted; and an interrupter that is provided on a charging power supply path from the charging power input terminal to the rechargeable battery and is capable of interrupting the charging power supply path by an interruption command from the microcomputer, wherein the microcomputer, when it is determined by the second determiner that the AD abnormal state has occurred, outputs the interruption command to direct the interrupter interrupt the charging power supply path.

12. A battery pack for electric power tool comprising:

at least one battery cell, and the microcomputer-equipped system for electric power tool according to claim 4, wherein a discharging circuit including a positive side resistor, a negative side resistor, and a switching unit is connected to the at least one battery cell, one end of the positive side resistor being connected to a positive terminal of the battery cell, one end of the negative side resistor being connected to a negative terminal of the battery cell, the switching unit being connected to the other ends of the respective resistors, and establishing/interrupting conduction between the other ends of the resistors in accordance with the execution command and the execution command from the microcomputer, the microcomputer is configured to monitor a voltage of the battery cell based on a result of AD conversion by the AD converter of a voltage outputted from the other end of the positive side resistor to the AD port when the conduction between the other ends of the resistors is interrupted by the switching unit, the discharging circuit functions as the signal voltage divider, and is configured to turn off the switching unit to directly output a voltage of the positive terminal of the battery cell to the AD port through the positive side resistor when the stop command is inputted, and to turn on the switching unit to divide the voltage of the positive terminal of the battery cell at the voltage dividing ratio by the respective resistors constituting the discharge circuit and generate the diagnostic analog signal when the execution command is inputted.

13. A battery pack for electric power tool comprising:
at least one battery cell, and
the microcomputer-equipped system for electric power tool according to claim 4, wherein
a discharging circuit including a positive side resistor, a negative side resistor, a switching unit, and a voltage dividing resistor, and a voltage detector are connected to the at least one battery cell, one end of the positive side resistor being connected to a positive terminal of the battery cell, one end of the negative side resistor being connected to a negative terminal of the battery cell, the switching unit being connected to the other end of the respective resistors, and establishing/interrupting conduction between the other ends of the resistors in accordance with the execution command and the execution command from the microcomputer, the voltage dividing resistor being provided in series with the switching unit between the other end of the respective resistors,
the microcomputer is configured to monitor a voltage of the battery cell based on a result of the AD conversion by the AD converter of a voltage outputted from the voltage detector to the AD port when the conduction between the other ends of the resistors is interrupted by the switching unit,
the discharging circuit functions as the signal voltage divider, and is configured to turn off the switching unit so that the voltage of the battery cell is directly inputted to the voltage detector when the stop command is inputted, and to turn on the switching unit to divide the voltage of the battery cell at the voltage dividing ratio by the respective resistors constituting the discharge circuit so that an output from the voltage detector to the divided voltage is generated as the diagnostic analog signal when the execution command is inputted.

14. A battery pack for electric power tool comprising:
at least one battery cell, and
the microcomputer-equipped system for electric power tool according to claim 1, wherein
a battery voltage signal directly or indirectly indicating a voltage of the at least one battery cells to the battery cell is configured to be inputted to the AD port as the analog signal to be AD converted, and
the microcomputer monitors a state of the battery cell based on a result of the AD conversion by the AD converter of the battery voltage signal.

15. The battery pack for electric power tool according to claim 14, wherein the at least one battery cell is a rechargeable battery.

16. The battery pack for electric power tool according to claim 15, further comprising:
a charging power input terminal through which a charging power for charging the rechargeable battery is inputted; and
an interrupter that is provided on a charging power supply path from the charging power input terminal to the rechargeable battery and is capable of interrupting the charging power supply path by an interruption command from the microcomputer, wherein
the microcomputer, when it is determined by the first determiner that the AD abnormal state has occurred, outputs the interruption command to direct the interrupter interrupt the charging power supply path.

17. A microcomputer-equipped system for electric power tool, the system comprising:
a microcomputer that includes an AD (analog-to-digital) converter and at least one AD port to which an analog signal to be AD converted by the AD converter is inputted;
a reference voltage generator that is separately provided from an operation power source of the microcomputer and generates and inputs to the AD port a reference voltage having a predetermined value;
a reference data storage unit that prestores reference data which is digital data corresponding to the reference voltage; and
a first determiner that is provided inside the microcomputer and compares diagnostic data obtained by AD conversion by the AD converter of the reference voltage inputted to the AD port with the reference data stored in the reference data storage unit to determine, in case that difference between the diagnostic data and the reference data is out of a predefined allowable range, that an AD abnormal state has occurred in which a correct result of the AD conversion is unable to be obtained from the AD converter,
wherein the reference voltage generator includes a diode, and is configured to generate as the reference voltage a forward voltage of the diode generated by applying a forward bias to the diode by a power inputted to the reference voltage generator.

18. A microcomputer-equipped system for electric power tool, the system comprising:
a microcomputer that includes an AD (analog-to-digital) converter and at least one AD port to which an analog signal to be AD converted by the AD converter is inputted;
a reference voltage generator that is separately provided from an operation power source of the microcomputer and generates and inputs to the AD port a reference voltage having a predetermined value;
a signal voltage divider that is provided on a signal path before the analog signal to be AD converted is inputted to the AD converter, and generates a diagnostic analog signal by voltage division of the analog signal at a predefined voltage dividing ratio when an execution command is inputted; and
a determiner that is provided inside the microcomputer, obtains a diagnostic data by directing the AD converter to AD convert the diagnostic analog signal when the voltage division is executed by the signal voltage divider, obtains a comparative data by directing the AD converter to AD convert the analog signal when the voltage division is not executed by the signal voltage divider, compares the obtained diagnostic data and the comparative data, and determines whether the AD abnormal state has occurred based on a result of the comparison.

* * * * *